(12) United States Patent
Bowe, Jr. et al.

(10) Patent No.: US 7,258,266 B1
(45) Date of Patent: Aug. 21, 2007

(54) DEFINING, ADMINISTERING, AND MANAGING AUTOMATIC IDENTIFICATION INFORMATION, SUCH AS BAR CODES

(75) Inventors: Thomas W. Bowe, Jr., Germantown, WI (US); Lisa J. Malden, San Francisco, CA (US); Daniel S. Lai, Cupertino, CA (US); S. Kishan Chetan, San Francisco, CA (US); Sathya N Thulasidas, Parsippany, NJ (US)

(73) Assignee: Siebel Systems, Inc., San Mateo, CA (US)

( * ) Notice: Subject to any disclaimer, the term of this patent is extended or adjusted under 35 U.S.C. 154(b) by 80 days.

(21) Appl. No.: 10/745,036

(22) Filed: Dec. 23, 2003

(51) Int. Cl.
*G06F 17/10* (2006.01)
(52) U.S. Cl. ............... 235/375; 235/462.07; 235/385; 235/462.25
(58) Field of Classification Search ............. 235/375, 235/462.07, 385, 383, 462.25
See application file for complete search history.

(56) References Cited

U.S. PATENT DOCUMENTS

| | | | | |
|---|---|---|---|---|
| 5,198,644 A | * | 3/1993 | Pfeiffer et al. ............... | 235/383 |
| 6,405,925 B2 | * | 6/2002 | He et al. ............... | 235/462.25 |
| 6,585,157 B2 | * | 7/2003 | Brandt et al. .......... | 235/462.07 |
| 6,655,594 B2 | * | 12/2003 | Barmettler et al. .... | 235/462.07 |
| 2001/0032101 A1 | * | 10/2001 | Statius ......................... | 705/2 |
| 2003/0042312 A1 | * | 3/2003 | Cato ...................... | 235/462.25 |
| 2003/0197062 A1 | * | 10/2003 | Shaw ......................... | 235/385 |
| 2004/0262392 A1 | * | 12/2004 | Longacre et al. ...... | 235/462.07 |
| 2005/0061887 A1 | * | 3/2005 | Garrison et al. ....... | 235/462.07 |

* cited by examiner

*Primary Examiner*—Michael G. Lee
*Assistant Examiner*—Alluson N Trail
(74) *Attorney, Agent, or Firm*—Campbell Stephenson LLP

(57) ABSTRACT

A method and system for collecting, storing, and processing automatic identification code information includes receiving automatic identification code information and parsing it based on stored definitions for automatic identification codes and/or automatic identification code standards. Various data configurations may be used to store definitions and to facilitate parsing of raw automatic identification code data. For example, a first component may be used for generally defining one or more automatic identification code standards and a second component may be used for detailed information regarding code definitions, such as information relating to code segments. In addition, the system may facilitate further processing of parsed automatic identification code information, such as for cycle counting or parts movement of inventory.

30 Claims, 16 Drawing Sheets

500 Bar Code Component

| | Attribute | Type | Use |
|---|---|---|---|
| 501 | Name | DTYPE_TEXT | Bar code standard name |
| 502 | Sequence | DTYPE_INTEGER | Order in which standard is evaluated |
| 503 | Buscomp | DTYPE_TEXT | Bounded picklist of available Buscomps in repository |
| 504 | Type | DTYPE_TEXT | E.g., location or code |
| 505 | Min Length | DTYPE_INTEGER | Min length of bar code standard |
| 506 | Max Length | DTYPE_INTEGER | Max Length of bar code standard |
| 507 | Prefix | DTYPE_TEXT | Beginning of bar code to identify standard |
| 508 | Suffix | DTYPE_TEXT | End of bar code to identify standard |
| 509 | ASCII Separator | DTYPE_INTEGER | ASCII# used to identify the end of variable length sections in a location type bar code or the end of code sections that contain a variable length sub-section. Ranges from 0-255. |
| 510 | Description | DTYPE_TEXT | Description of symbology |

Bar Code Segment Component 550

| | Attribute | Type | Use |
|---|---|---|---|
| 551 | Name | DTYPE_TEXT | Bar code segment name |
| 552 | Sequence | DTYPE_INTEGER | Location Type Codes: Order in which to parse a bar code segment. Code Type Codes: Order in which to parse a sub-section in a code segment. |
| 553 | Code | DTYPE_TEXT | Code value at the begining of a code segment (read-only for location type codes) |
| 554 | Min Length | DTYPE_INTEGER | Min length of segment |
| 555 | Max Length | DTYPE_INTEGER | Max length of segment |
| 556 | Description | DTYPE_TEXT | Description of bar code segment |
| 557 | Data Description | DTYPE_TEXT | Name to describe bar code segment in property set |
| 558 | Data Format | DTYPE_TEXT | For application service use |
| 559 | Action | DTYPE_TEXT | For application service use |
| 560 | Bar code ID | DTYPE_ID | ID of parent record in bar code object/component |

*FIG. 5*

Enable Component  600

| Atttribute | Type | Use |
|---|---|---|
| 601 — View | DTYPE_TEXT | View to enable scanning in |
| 602 — Applet | DTYPE_TEXT | Applet to enable scanning in |
| 603 — Field | DTYPE_TEXT | Buscomp field to enable scanning in |
| 604 — Buscomp | DTYPE_TEXT | The business component on which the selected applet or view is based on. |

| Cycle Count ▽ | Show: | Cycle Count Detail ▽ |

*Location: Pacific General Catheter Lab (MD)
Account: Pacific Cardiology
Comments: Count Stents

| Scan | Count Complete |

| *Product | Part # | Qty | Descript |
|---|---|---|---|
| ⇒ Rx Stent 18mm | MD-C112 | 3 | 18mm D |
| Coronary Acce | MD-C3 | 1 | Corona |
| OTW | MD-C13 | 5 | Over-th |
| Helix Stent 18mm | MD-C122 | 2 | 18mm H |
| Angio 15mm | MD-C211 | 1 | 15mm B |
| Angio 20mm | MD-C212 | 1 | 20mm B |

Counted Products: 1 of 6

Mobile Administration — CA  AA  UA

[Menu] [New] [Query]  1 – 7 of 7

| Name | Sequence | Barcode Type | Buscomp | Min Length | Max Length | Prefix | Suffix | Separate |
|---|---|---|---|---|---|---|---|---|
| >Medical HIBC Primary (1411) | 1 | Location | | 8 | 20 | +& | | |
| Medical HIBC Secondary -# (1412) | 2 | Location | | 13 | 21 | -# | | |
| Medical HIBC Secondary -5# (1413) | 3 | Location | | 9 | 17 | -5# | | |
| Medical HIBC Secondary -5& (1414) | 4 | Location | | 9 | 17 | -5& | | |
| Medical HIBC Secondary -550 (1415) | 5 | Location | | 14 | 22 | -550 | | |
| Medical HIBC Secondary -551 (1416) | 6 | Location | | 14 | 22 | -551 | | |
| Medical HIBC Secondary -552 (1417) | 7 | Location | | 18 | 24 | -552 | | |

1410

[Menu] [New] [Query]  1 – 5 of 5

| Name | Code | Sequence | Min Length | Max Length | Data Desc | Data Format | Action | Description |
|---|---|---|---|---|---|---|---|---|
| >Plus (1421) | | 1 | 1 | 1 | Plus | | | |
| LIC (1422) | | 2 | 4 | 4 | LIC | | | |
| Product Reference ID (1423) | | 3 | 1 | 13 | Product Reference ID | | | |
| UOH (1424) | | 4 | 1 | 1 | UOH | | | |
| LC (1425) | | 5 | 1 | 1 | LC | | | |

Figure 15:
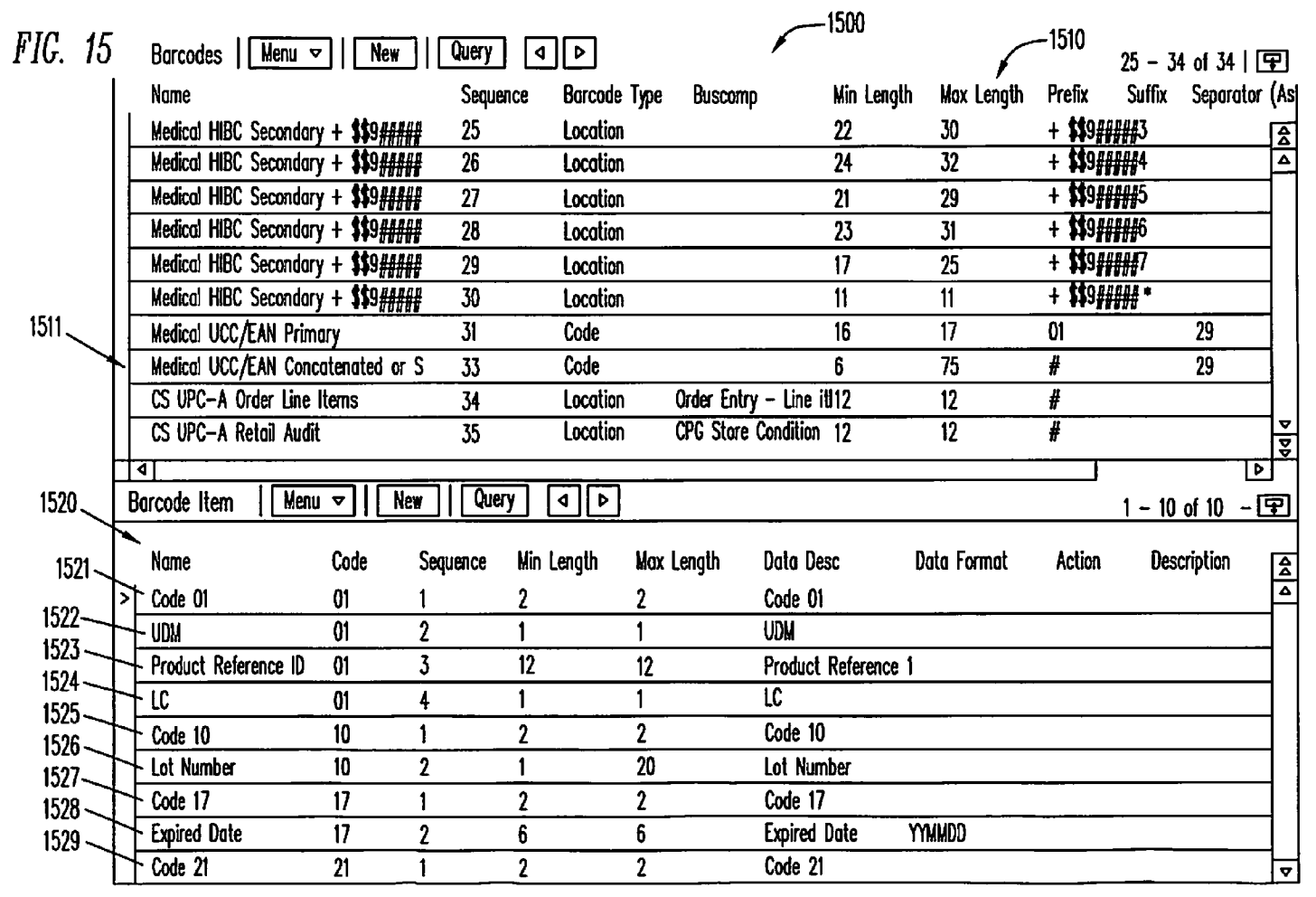

Barcodes | Menu ▽ | New | Query ▽ △ ▽                                                                                                    25 - 34 of 34

| Name | Sequence | Barcode Type | Buscomp | Min Length | Max Length | Prefix | Suffix | Separator (As |
|---|---|---|---|---|---|---|---|---|
| Medical HIBC Secondary + $$9##### | 25 | Location | | 22 | 30 | + $$9##### | 3 | |
| Medical HIBC Secondary + $$9##### | 26 | Location | | 24 | 32 | + $$9##### | 4 | |
| Medical HIBC Secondary + $$9##### | 27 | Location | | 21 | 29 | + $$9##### | 5 | |
| Medical HIBC Secondary + $$9##### | 28 | Location | | 23 | 31 | + $$9##### | 6 | |
| Medical HIBC Secondary + $$9##### | 29 | Location | | 17 | 25 | + $$9##### | 7 | |
| Medical HIBC Secondary + $$9##### | 30 | Location | | 11 | 11 | + $$9##### | * | |
| Medical UCC/EAN Primary | 31 | Code | | 16 | 17 | 01 | | 29 |
| Medical UCC/EAN Concatenated or S | 33 | Code | | 6 | 75 | # | | 29 |
| CS UPC-A Order Line Items | 34 | Location | Order Entry – Line it#12 | 12 | 12 | # | | |
| CS UPC-A Retail Audit | 35 | Location | CPG Store Condition 12 | 12 | 12 | # | | |

1510
1511

Barcode Item | Menu ▽ | New | Query ▽ △                                                                                       1 - 10 of 10

| Name | Code | Sequence | Min Length | Max Length | Data Desc | Data Format | Action | Description |
|---|---|---|---|---|---|---|---|---|
| Code 01 | 01 | 1 | 2 | 2 | Code 01 | | | |
| UDM | 01 | 2 | 1 | 1 | UDM | | | |
| Product Reference ID | 01 | 3 | 12 | 12 | Product Reference 1 | | | |
| LC | 01 | 4 | 1 | 1 | LC | | | |
| Code 10 | 10 | 1 | 2 | 2 | Code 10 | | | |
| Lot Number | 10 | 2 | 1 | 20 | Lot Number | | | |
| Code 17 | 17 | 1 | 2 | 2 | Code 17 | | | |
| Expired Date | 17 | 2 | 6 | 6 | Expired Date | YYMMDD | | |
| Code 21 | 21 | 1 | 2 | 2 | Code 21 | | | |

Product

[Menu ▽] | [New] [Delete] [Query]

| 1 of 15+ |

Parent: Helix Stent
Organization: Medical Products (M)
Profit Rank:
Level: 4
Rollup Level: 1
Root: Coronary Product
Barcode: HIBC — 1601
Unique ID: H1BC122 — 1602
Expression: Lot Number, Serial numb — 1603
Lot #:

Start: 5/19/2002
End:
Approval:
Approver:
Frequency:
U/M: Each
Doses/Unit:
Unit Size:
Units/Case:
Qty:

*Price Type: One-Time
Sample Cost:
Promo Cost:
WAC:
HS ID:
ND#:
Manufacturer:
Part # Method:
Vendor:
Vendor Part #:

Unique Assets: ☑
Requires Approval: ☐
>1 Barcode: ☑ — 1604
Orderable: ☑
Sales Products: ☑
Service Product: ☐
Resources: ☐
Bundle: ☐
Taxable: ☐
Disable Discount: ☐

DEFINING, ADMINISTERING, AND MANAGING AUTOMATIC IDENTIFICATION INFORMATION, SUCH AS BAR CODES

TECHNICAL FIELD

This invention relates generally to the area of automatic identification technology and more specifically to the area of flexibly managing automatic identification information, such as bar codes.

BACKGROUND

Makers, distributors, sellers, and buyers of commercial goods often rely on bar codes or similar automatic identification techniques to identify products. In general, automatic identification techniques provide a way to quickly identify products, items, records, or other entities marked with tags or other identifying indicia using an input device (e.g., a bar code scanner). For example, the use of bar codes and other automatic identification techniques facilitates data entry. In such cases, an operator can use a scanning device to scan bar code symbols on products or product packaging into a computer system that recognizes each bar code as being linked to a specified product.

In some industries, identification tags (e.g., printed bar codes) and their associated structures are standardized to include specific information and formatting. For example, the health industry has developed a specialized Health Industry Bar Code (HIBC) standard. Details regarding health industry bar code standards can be found in an American National Standards Institute document entitled "The Health Industry Bar Code (HIBC) Supplier Labeling Standard" (1997).

Most known bar code standards are either location-based or code-based. With location-based bar codes, the order of the information presented in the bar code plays a role in how the bar code is interpreted. The data contained in the bar code and its sequence within the bar code are predetermined. With code-based bar codes, the order and presence (or absence) of the information presented in the bar code does not matter. In this type of design, special codes precede each data element to indicate the type, meaning, and format of data to follow. An example of a code-based bar code scheme is UCC/EAN (see, e.g., http://www.uc-council.org/ean_ucc_system/index.html).

With UCC/EAN, the bar code is divided into segments. Each segment is either fixed in length or variable in length. Segments with variable length either end with a separator or are, alternatively, located at the end of a data sequence.

Once scanned or otherwise inputted into temporary electronic storage, bar codes are typically processed or stored by a computer. To ensure that the data contained in the bar code is meaningful, the computer typically has some way of recognizing each bar code it receives as input. Enabling such recognition usually involves a user performing systematic data entry and data identification for a series of items read by the device. In most cases, a user conducts an initial scan of raw bar code data into the application and then provides matching product information for the raw bar code data. This type of solution is inflexible, as it does not allow for customization to handle new standards and requires excess data entry. Alternatively, a user may utilize a hard code system designed to interpret a specific bar code symbology. This solution, too, is inflexible, requiring separate solutions for each symbology as well as an inability to represent custom schemes or make changes in a runtime environment.

Bar code information can be used in many practical applications. Cycle counting is one example of a practical use for bar code data. In some industries, customers or purchasers of goods may store inventory owned by the manufacturer. This type of inventory is sometimes referred to as a "consignment inventory." Manufacturers typically replenish consignment inventories on an as-needed basis. One way to track consignment inventories involves the use of cycle counts.

Cycle counting typically involves performing a series of steps that result in substantial administrative effort. In a typical cycle counting process, a user (e.g., sales representative, service engineer, or other operator) performs cycle counting on a customer's premises. To begin the process, an inventory manager creates lists of expected inventory on paper or using a word processing application and then mails, faxes, or otherwise transmits the lists to a user. The user counts the physical inventory on hand and manually updates the list with additions, corrections, and deletions. He or she manually identifies expired products and products nearing their expiration dates. The user then faxes the updated list back to the inventory manager who updates an electronic record. The revised inventory may be used to replenish inventory locations and generate invoices.

This technique for cycle counting often results in outdated and/or otherwise inaccurate inventory information. In the case of negotiated pricing benefits contingent on inventory stocking or usage levels, the process may also result in pricing benefits being delivered to customers without current inventory visibility. In addition, the manual data entry typically resorted to with this technique can be tedious, inaccurate, and inefficient. This is especially true in the case where a given product has multiple assets that each require unique identification codes. Alternatively, bar code information may be used in physical inventory counting, patient information, or any other application benefiting from either rapid data entry or increased data accuracy.

BRIEF DESCRIPTION OF THE DRAWINGS

FIG. 5 is a data diagram showing examples of a bar code repository object/component and a segment repository object/component for defining aspects of a bar code standard in more detail.

FIG. 6 is a data diagram showing an example of a bar code enable repository object/component.

FIG. 11 is a display diagram showing a cycle count being initiated.

FIG. 12 is a display diagram showing the automatic parsing and validation of data in a cycle count.

FIG. 13 is a display diagram showing a screen that displays product and asset information counted in a cycle count.

FIG. 14 is an example of an administration screen for representing location-based bar code symbologies and bar code data elements.

FIG. 15 is a second example of an administration screen for defining bar codes and bar code segments.

FIG. 16 is a third example of an administration screen from which specific product information may be entered.

DETAILED DESCRIPTION

Figure 1:
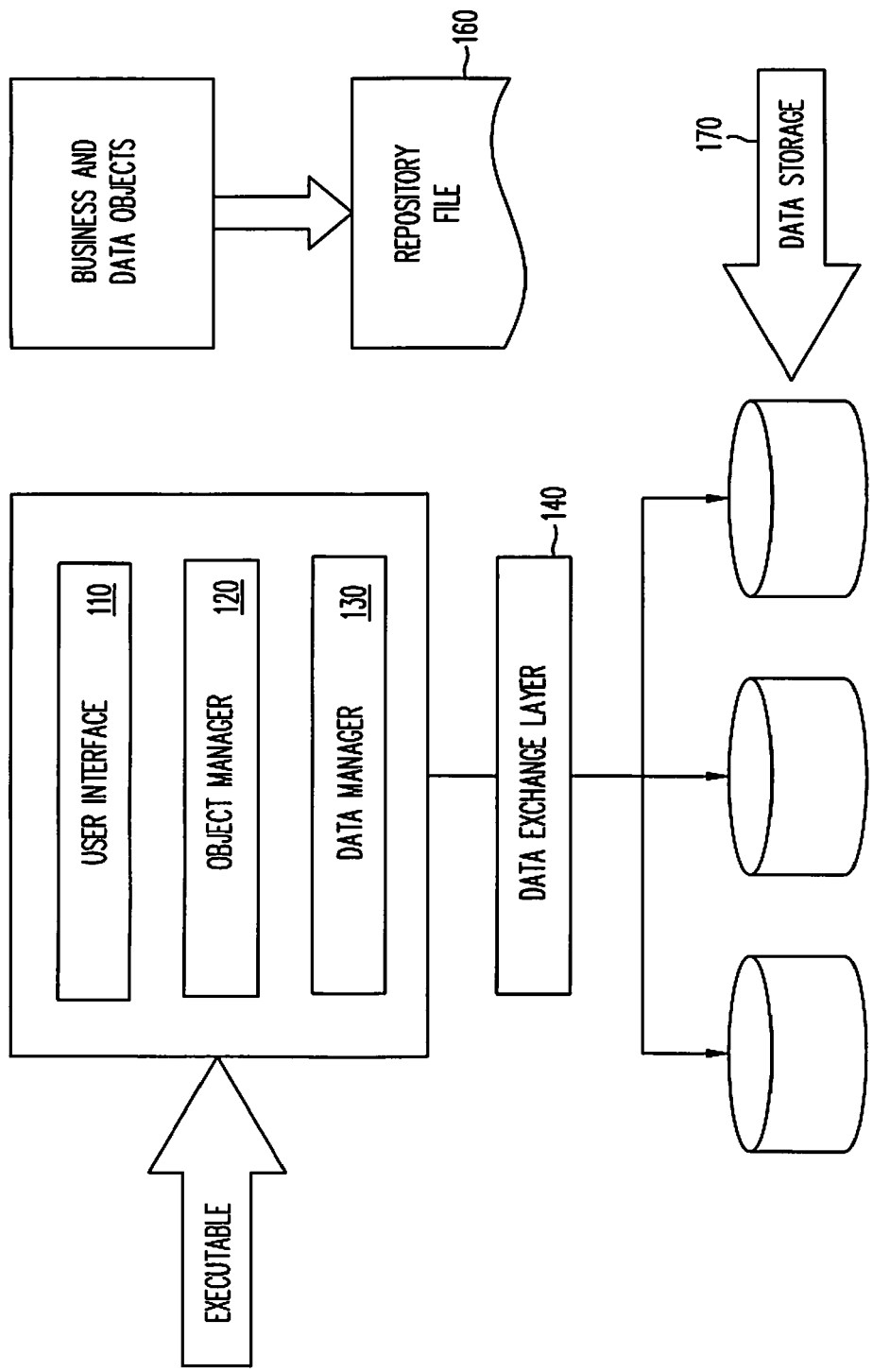
FIG. 1 is a block diagram showing a multi-layered system architecture in which the teachings of the present invention may be implemented.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

In one embodiment, automatic identification code information, such as bar code information, is defined, administered, and managed using a system recognizing a flexible and declarative data structure for storing automatic identification code definitions. The system and its associated data structures facilitate rapid parsing, validation, and insertion of data into applications for processing automatic identification code information. For example, once bar code data is scanned and parsed, it can be stored as records in table(s) and used in cycle counting and/or parts movement applications, as well as other inventory-related applications. In some cases, the system and associated applications can run, at least partially, on handheld devices. Because the system provides a flexible data structure, it becomes possible to easily define new automatic identification code schemes, even in a runtime environment (e.g., without recoding).

Because there are so many possible variations for automatic identification code information and there are multiple known bar code standards, the system provides an environment that allows administrative users to generically define one or more automatic identification codes. The system also supports various input/reader devices, including both "dumb" and "smart" devices.

Once automatic identification code information is inputted into the system (e.g., via a bar code reader), the system parses the automatic identification code information based on any available automatic identification code definitions. After it is parsed, the automatic identification code information can be used to provide general item or entity information (e.g., product information), as well as more specific information about an item or entity (such as the lot in which a product was manufactured or sterilized, the expiration data for a particular batch of products, etc.).

To provide an end user with information about inputted automatic identification code information, the system can provide various views or screens, including a view that shows information captured in a scanning/input event. Similarly, the results of an inventory or cycle count can be displayed on a screen showing counts for products, items, or entities. From the various views or screens, users can drill further into each product, obtaining additional information for a particular instance of a product, item, or entity, also called an asset.

Such views or screens can be customized for various product types and various industries. For example, a medical bar code view could be created that shows product and asset information specific to medical products, including both generic and specific information about assets. With respect to certain products, each asset may or may not be uniquely identifiable. However, using a combination of product bar code information and asset bar code information, a unique asset can be identified.

Automatic identification code information can be used to track the states of products. In this way, the system can provide real-time data validation capabilities. For example, instances of products (e.g., assets) can be associated with status information such as "good," "expired," and "short-dated" (i.e., about to expire). In some embodiments, audible alerts may be used to signal different states. For example, an identifiable audible alert may be generated when an expired object is scanned. This distinguishes it from an item that is "good." In this way, audible alerts may be used to facilitate rapid data input by enabling audio as well as visual assessment of an asset's state. In addition, audible alerts may be used to identify errors, such as errors in scanning. In this way, the operator of the scanning device can take immediate action to correct an error. To provide for audible alerts and other alerts regarding scanned products, mappings between various events and audio files can be created.

In general, the system is automated and provides a rapid data entry mechanism for cycle counting and parts movement. The system may support automatic identification code standards, such as UCC/EAN and HIBC standards, "out of the box." It may also enable easy and efficient representation of additional automatic identification code standards, including custom code schemes. The system may handle information relating to on-hand quantities, usage, variance, and contracted consignment levels of cross-product hierarchies. The system may provide comprehensive real-time results as well as insight into customer purchasing behaviors. The system may be wireless enabled, allowing for asynchronous wireless queries and wireless store and forward capabilities.

In these and other ways, the system facilitates inventory management, assists with contract compliance, and minimizes product loss and expiration. In addition, it collects product usage behavior. For example, it can be used to automatically assign cycle counts, count inventory, analyze and review results, review real-time inventory, process results, synchronize results, and move outdated inventory. It can be used to calculate variance between counted inventory and expected inventory. It can also be used to generate inventory transactions needed to reconcile inventory.

While the following illustrative embodiments provide many examples using bar codes and bar code scanners, one skilled in the art would understand that some embodiments of the invention may be practiced using other types of automatic identification data. For example, some embodiments may be implemented to manage radio frequency identification (RFID) tags.

II. System Architecture

A system in which the teachings of the present invention are implemented can be logically structured as a multi-layered architecture as shown in FIG. 1. The logical multi-layered architecture as shown in FIG. 1 may provide a platform for common services to support the various applications. These services may include a user interface layer 110, an object manager layer 120, a data manager layer 130, and a data exchange layer 140.

The user interface layer 110 may provide the applets, views, charts and reports, etc., associated with one or more applications. Various types of clients can be supported via the user interface layer 110. These various types of clients may include traditional connected clients, remote clients, thin clients over an intranet, Java thin clients on non-Windows-based operating systems, HTML clients over the Internet, etc.

The object manager layer 120 is designed to manage one or more sets of business rules or business concepts associated with one or more applications and to provide the interface between the user interface layer 110 and the data manager layer 130. The business rules or concepts can be represented as business objects. The business objects may be designed as configurable software representations of the various business rules or concepts, such as accounts, contacts, opportunities, service requests, solutions, etc.

The data manager layer 130 is designed to maintain logical views of the underlying data and to allow the object manager layer 120 to function independently of underlying data structures or tables in which data are stored. The data manager layer 130 may also provide certain database query functions such as generation of structure query language (SQL) in real time to access the data. The data manager layer 130 may be designed to operate on object definitions in a repository file 160 that define the database schema. A data storage services 170 provide the data storage for the data model associated with one or more applications.

The data exchange layer 140 is designed to handle the interactions with one or more specific target databases and provide the interface between the data manager layer 130 and the underlying data sources.

Figure 2:
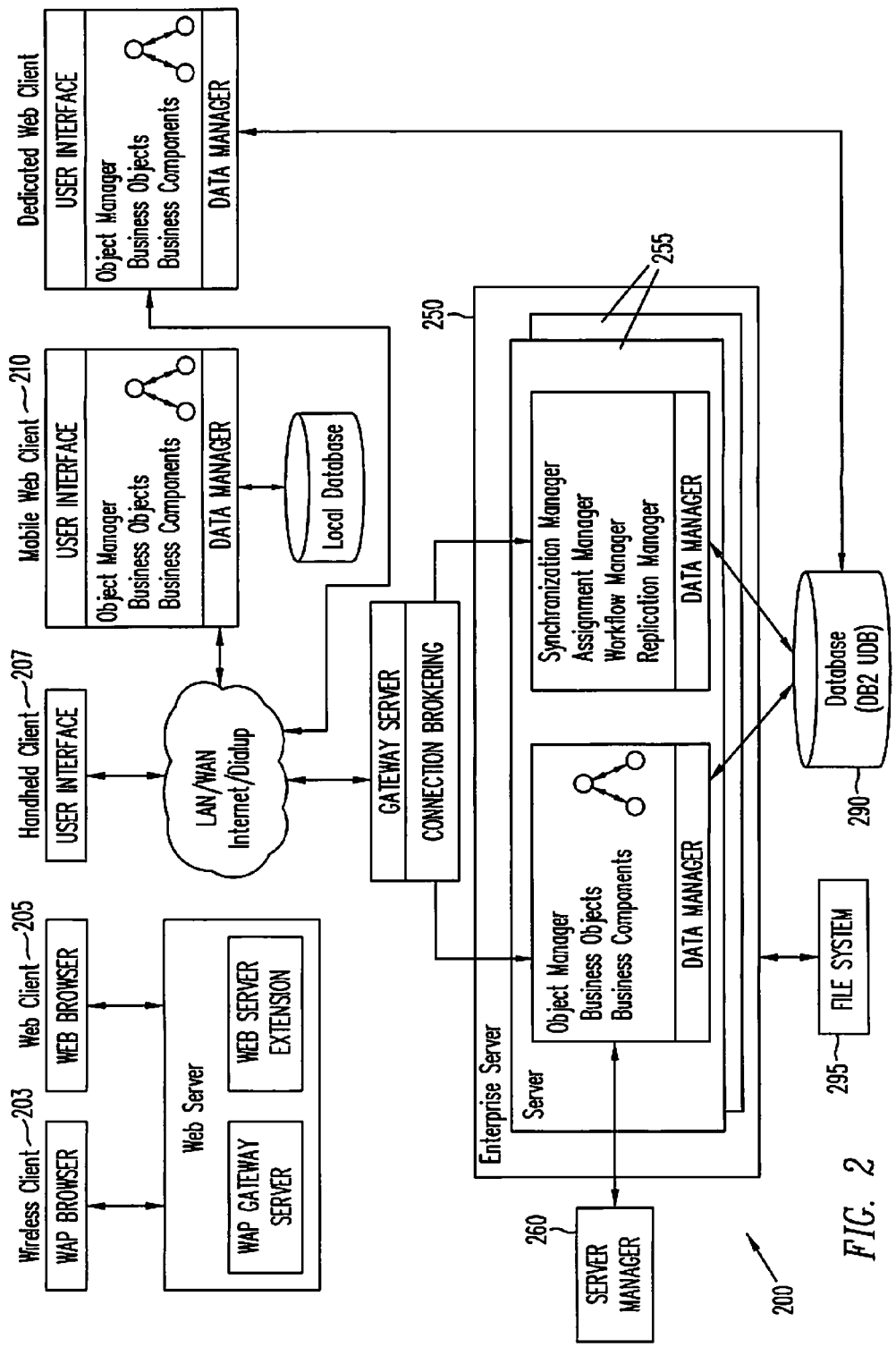
FIG. 2 is a block diagram showing one embodiment of a system configuration in which the teachings of the present invention may be implemented.

FIG. 2 shows a block diagram of some embodiments of a system configuration in which the teachings of the present invention are implemented.

The multi-layered architecture allows one or more software layers to reside on different machines. For example, in some embodiments, the user interface, the object manager, and the data manager can all reside on dedicated web clients 200. For other types of clients such as wireless clients 203, the object manager and data manager can reside on a system server. It should be appreciated and understood by one skilled in the art that the system configuration shown in FIG. 2 is for illustrative and explanative purposes and may vary depending on the particular implementations and applications of the teachings of the present invention.

The system environment illustrated in FIG. 2 may include more than one database 290. One or more subsets of the database 290 can be created or replicated by a replication manager. In addition, mobile web clients 210 can have additional remote databases (also called local databases). In some embodiments, unless the remote or local databases associated with the mobile web clients 210 are defined as read-only databases, these mobile web clients 210 can create and update data locally that will ultimately be propagated up to the primary database when each mobile web client 210 synchronizes with the system server.

The database 290 is designed to store various types of data, including predefined data schema (e.g., table objects, index objects, etc.), repository objects (e.g., business objects and components, view definitions and visibility rules, etc.), and a user's or customer's data. The dedicated web clients 200 and server components, including those that operate in conjunction with the other types of clients, can connect directly to the database 290 and make changes in real time. The mobile web clients 210 can download a subset of the server's data to use locally, and periodically synchronize with the server database through the system server to update both the local and the server database. Various tables included in the database 290 may be logically organized into the following types: data tables, interface tables, repository tables, etc.

Data tables may be used to store user business data, administrative data, seed data, transaction data, etc. These data tables may be populated and updated through the various applications and processes. Data tables may include base tables and the intersection tables. The base tables may contain columns that are defined and used by the various applications. The base tables may be designed to provide the columns for a business component specified in the table property of that business component. The intersection tables are tables that may be used to implement a many-to-many relationship between two business components. They may also hold intersection data columns, which store information pertaining to each association. In some embodiments, intersection tables provide the data structures for association applets.

In some embodiments, interface tables are used to denormalize a group of base tables into a single table with which external programs can interface. In some embodiments, they may be used as a staging area for exporting and importing data.

Repository tables contain the object definitions that specify one or more applications regarding:

The client application configuration;

The mapping used for importing and exporting data;

Rules for transferring data to mobile clients.

A file system 295 is a network-accessible directory that can be located on an application server. The file system 295 stores the physical files created by various applications, such as files created by third-party text editors, and other data that is not stored in the database 290. In some embodiments, physical files stored in the file system 295 can be compressed and stored under various naming conventions. The dedicated web clients 200 can read and write files directly to and from the file system 295. The mobile web clients 210 can have a local file system, which they periodically synchronize with the server-based file system 295. In some embodiments, other types of clients such as the wireless clients 203 and web clients 205 can access the file system 295 via the system server.

An enterprise server 250 consists of some logical grouping of system servers 255 that share a common table owner or database and point to a common gateway server. The system servers 255 can be administered as a group using a server manager 260. The connection to the gateway server can be established via TCP/IP. The enterprise server 250 can be scaled effectively by deploying multiple system servers 255 in the enterprise server 250, thus providing a high degree of scalability in the middle tier of applications.

Each of the system servers 255 runs one or multiple server programs and handles the incoming processing requests and monitors the state of processes. Server programs may be designed and configured to perform one or more specific functions or jobs, including importing and exporting data, configuring the database, executing workflow and process automation, processing to support mobile web clients 210 for data synchronization and replication, enforcing business rules, etc. In some embodiments, each of the system servers 255 can be an NT Service (under the Windows NT operating system) or a daemon (e.g., a background shell process) under the UNIX operating system. In some embodiments, each of the system servers 255 supports both multi-process and multi-threaded components and can operate components in batch, service, and interactive modes.

The server manager 260 is configured as a utility that allows common control, administration, and monitoring across disparate programs for the system servers 255 and the enterprise server 250. In some embodiments, the server manager 260 can be used to perform the following tasks: start, stop, pause and resume servers 255, components, and tasks; monitor status and collect statistics for multiple tasks, components, and servers within the enterprise server 250; and configure the enterprise server 250, individual servers, individual components and tasks, etc.

The gateway server can be configured as a logical entity that serves as a single entry point for accessing servers. It can be used to provide enhanced scalability, load balancing, and high availability across the enterprise server. In some embodiments, the gateway server may include a name server and a connection brokering component. In some embodiments, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as an NT service. In a UNIX environment, the name server can run as a daemon process. In some embodiments, the connection brokering component is used to perform load balancing functions such as directing client connection requests to an appropriate server (e.g., the least-busy server).

As illustrated in FIG. 2, the various types of clients that can be supported by the system may include the following clients: dedicated web clients 200, mobile web clients 210, web clients 205, wireless clients 203, handheld clients 207, etc.

Dedicated web clients 200 (also called connected clients) are connected directly to a database server for data access via a LAN or WAN connection. In some embodiments, these connected or dedicated web clients 200 do not store data locally. These dedicated web clients 200 can also access the file system directly. In some embodiments, the user interface layer 110, the object manager layer 120, and the data manager layer 130 of the multi-layered architecture reside on the dedicated web client 200.

The mobile web clients 210 are designed and configured for local data access and thus can have their own local database and/or local file system. Mobile web clients 210 can interact with other components within the system via the gateway server. Through synchronization, the modifications from the local database and the server database can be exchanged. Mobile web clients 210 are described in more detail below.

The web client 205 runs in a standard browser format from the client's machine and can connect to a system server 255 through a web server. The system server 255 may be designed and configured to execute business logic and access data from the database 290 and file system 295. The web client 205 described herein is designed and configured in accordance with the teachings of the present invention to operate in an interactive mode. The interactive web client framework as described herein may utilize dynamically created objects implemented in JavaScript on the browser side that correspond to objects on the server side. These dynamically created objects on the browser side may include the current view and its corresponding applets, the current business object and the corresponding business components, etc. The web client 205 is described in more detail below.

The wireless clients 203 are essentially thin clients enabled on wireless devices. The wireless clients 203 can use a wireless application protocol (WAP) based user interface to communicate and exchange information/data with the system server.

The system configuration illustrated in FIG. 2 is described in more detail below with references to various structures, databases, tables, file systems, etc., as illustrating examples.

Figure 3:
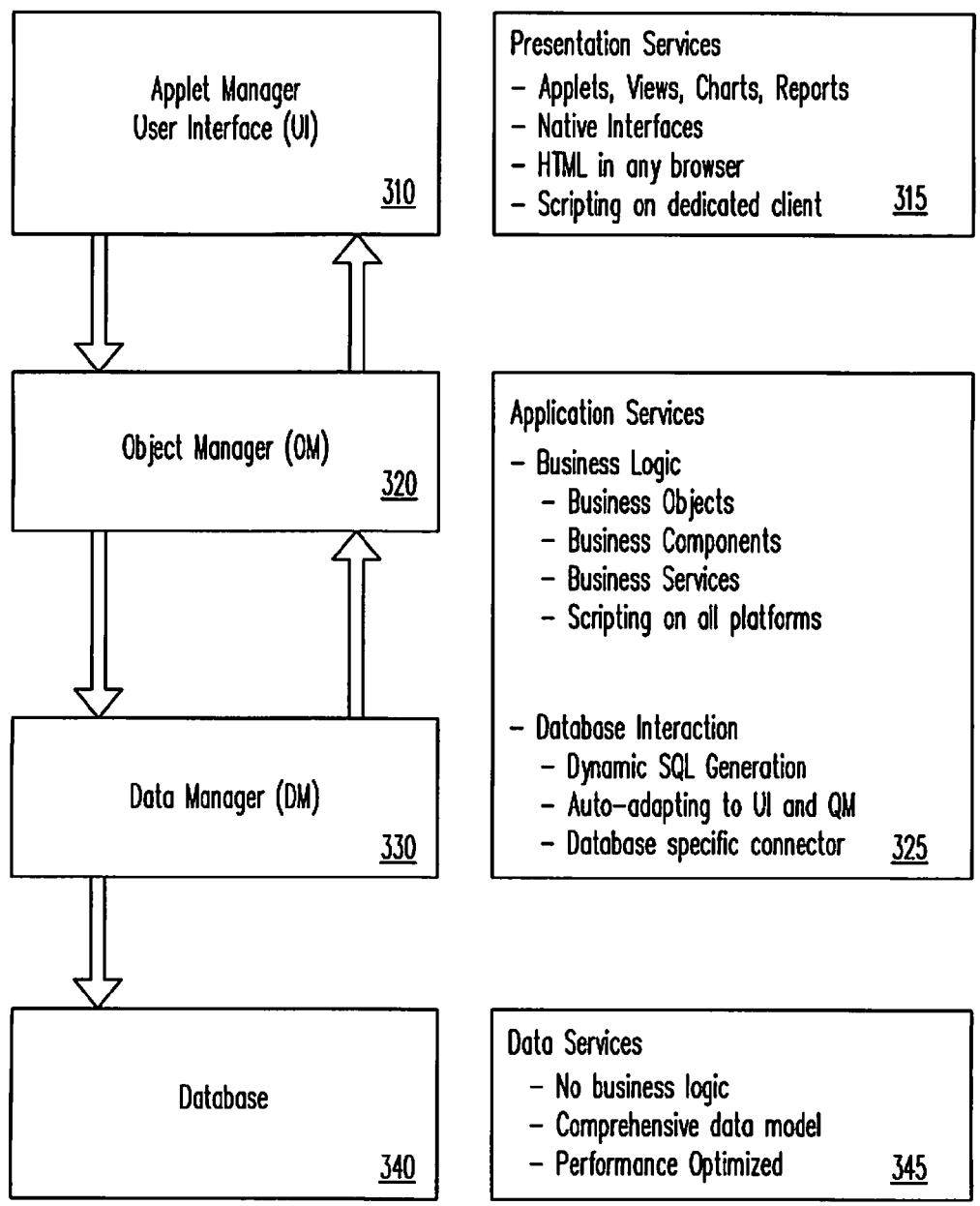
FIG. 3 is a block diagram showing another logical representation of a multi-layered architecture in which applications can be built in accordance with the teachings of the present invention.

FIG. 3 shows a block diagram illustrating another logical representation of a multi-layered architecture in which applications can be built in accordance with the teachings of the present invention. Again, the multi-layered architecture as illustrated in FIG. 3 provides the configured platform for various common services designed to support the various applications. In some embodiments, these various services may include a presentation services logic layer 315, which corresponds to an applet manager and user interface layer 310, an application services logical layer 325, which corresponds to an object manager (OM) layer 320, and a data manager (DM) layer 330 and a data services logical layer 345, which correspond to a database layer 340.

The presentation services 315 may be designed and configured to support various types of clients and may provide them with user interface applets, views, charts and reports, etc. As described above, a large variety of clients may be supported (e.g., wireless clients, handheld clients, web clients, mobile web clients, dedicated (connected) clients, etc.).

The application services 325 may include business logic services and database interaction services. The business logic services provide the class and behaviors of business objects and business components. Database interaction services may be designed and configured to take a user interface request for data from a business component and generate the database commands (e.g., SQL queries, etc.) necessary to satisfy the request. For example, the data interaction services may be used to translate a call for data into DBMS-specific SQL statements.

Data services 345 may be designed and configured to provide the data storage for the underlying data model that serves as the basis of the various applications. For example, the data model may be designed and configured to support various software products and applications including call center, sales, services and marketing, as well as various industry vertical products and applications, such as eFinance, eInsurance, eCommunications, and eHealthcare.

Figure 4:
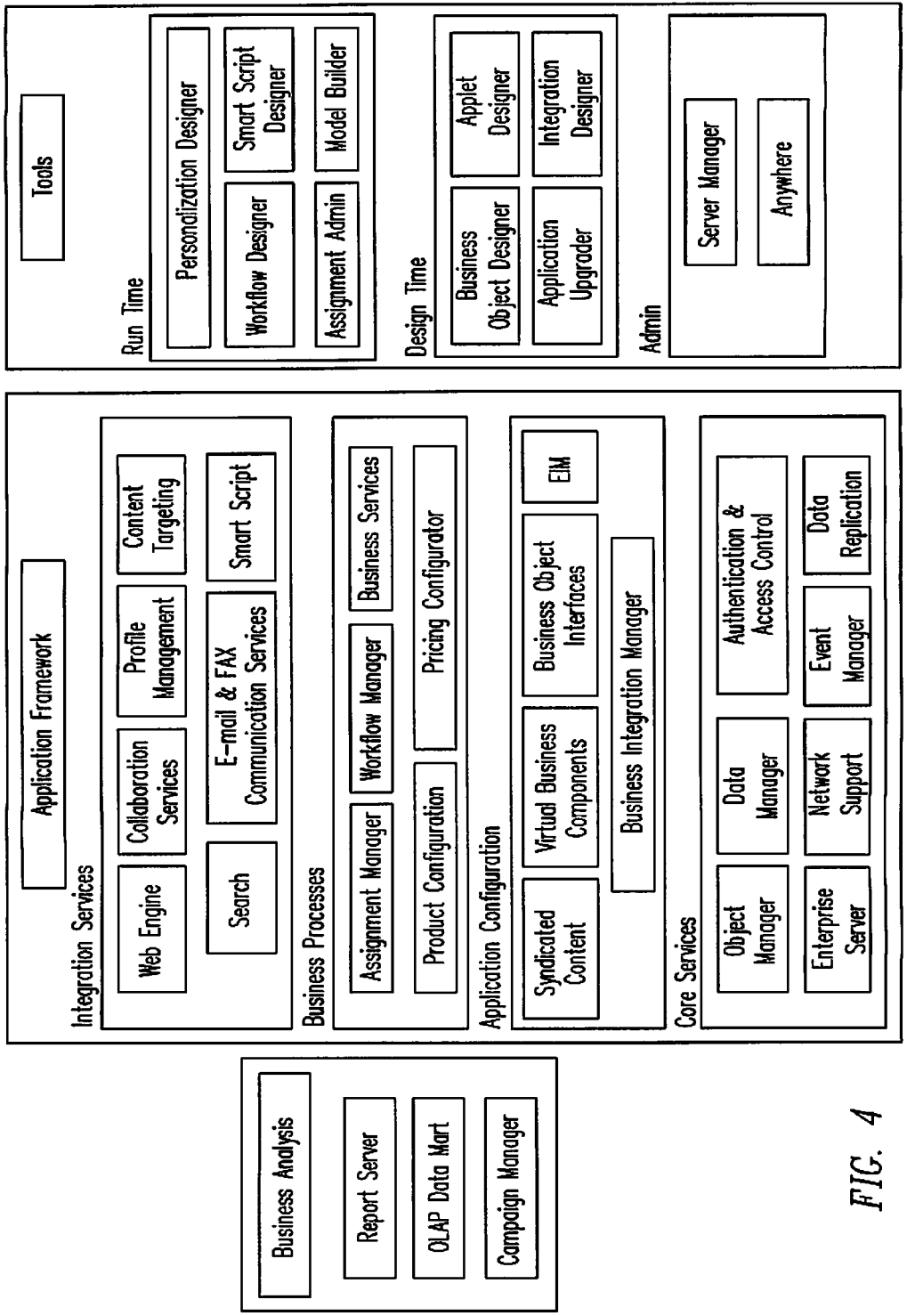
FIG. 4 is a block diagram showing one embodiment of an application framework in which the teachings of the present invention may be implemented.

FIG. 4 illustrates a block diagram of one embodiment of an application framework in which the teachings of the present invention may be implemented. As illustrated in FIG. 4, the application framework may include various logical groupings of various types of services and various types of tools that can be used to design and configure particular applications based on business needs and environments.

The core services are designed and configured to provide the framework in which the applications execute. In some embodiments, the core services may include the following:

The enterprise server, which is the middle-tier application server;

The networks that link all of these pieces together;

Facilities such as event manager and data replication, which allow sharing data between multiple installations of various applications, as well as between the various applications and other external applications;

The authentication, access control, and security facilities.

Application integration services may be designed and configured to allow the various applications built in accordance with this framework to communicate with the external world. In some embodiments, the various types of services in this logical grouping may be designed and configured to provide for real-time, near-real-time, and batch integration with external applications. For example, these integration services may be used to enable communications between external applications and internal applications using available methods, technologies, and software products. Application integration services allow the systems or applications to share and replicate data with other external enterprise applications. Accordingly, these services allow a particular application or system to be both a client requesting information and a server having information requested from it.

Business processes services are designed and configured to allow the client to automate business processes through the application. In some embodiments, these various business process services may include the following:

Assignment of tasks through Assignment Manager;

Enforcement of business practices through Workflow Manager;

Reuse of custom business logic through Business Services;

Ensuring proper product configuration and pricing through the Product Configurator and Pricing Configurator.

Creation of these business processes can be done through run-time tools such as Personalization Designer, Workflow Designer, SmartScript Designer, Assignment Administration Views, and Model Builder.

Integration services may be designed and configured to provide the client with user interface and thin client support. In some embodiments, these may include capabilities for building and maintaining web-based applications and for providing web support facilities such as user profile management, collaboration services, email and fax services, advanced smart Scripting, etc.

Design time tools may be designed and configured to provide the services to customize, design, provide integration points, and maintain the application. These various tools provide one common place to define the application.

Administrative services are designed and configured to provide one place to monitor and administer the application environment. These types of services allow the user to administer the application either through a graphical user interface (GUI) or from a command line, etc.

III. Administrative Setup and Repository Objects/Components

An administrative user may provide the system with initial bar code definition information via an administrative display user interface. This initial information will define structures of bar codes complying with one or more standards. Once configured with this initial bar code information, the system has adequate information to parse bar codes complying with such known standards and to generate a mapping of name and value pairs, sometimes referred to as a property set of various bar code components.

FIG. 5 shows an example of a bar code repository object/component 500 for generally defining a bar code standard. FIG. 5 also shows an example of a bar code segment repository object/component 550 for defining aspects of a bar code standard in more detail. In the illustrated embodiment, the segment component 550 is a child of the bar code component 500.

Attributes of the bar code component 500 include a name attribute 501, a sequence attribute 502, a buscomp attribute 503, a type attribute 504, a min length attribute 505, a max length attribute 506, a prefix attribute 507, a suffix attribute 508, an ASCII separator attribute 509, and a description attribute 510.

The name attribute 501 of the bar code component 500 identifies a bar code standard name (e.g., HIBC). The sequence attribute 502 provides precedence information that enables bar code component records in the system to be evaluated in an organized sequence. The buscomp attribute 503 identifies the business component to which the bar code standard applies. The type attribute 504 identifies a category for the bar code standard (e.g., whether the bar code standard is location-based or code-based) and indicates how to parse data in a bar code using child records. The min length attribute 505 stores information relating to the minimum length of the bar code. The max length attribute 506 identifies the maximum length of the bar code. The prefix attribute 507 identifies specific characters or symbols at the beginning of the bar code. Such prefixes may be used to differentiate the standard from other bar code standards. The suffix attribute 508 identifies the end of a bar code as defined by the standard. The ASCII separator attribute 509 identifies the ASCII character used to identify the end of variable length segments in a bar code or the end of code segments that contain variable length subsections, as each bar code may contain multiple variable length segments. The description attribute 510 identifies a description of the symbology for the bar code standard.

To represent some bar code standards, including the HIBC standard (illustrated in part in FIG. 14, 1401-1407), "wild cards" are used. For example, with the HIBC standard, the prefix/suffix values are exact strings to compare to bar code data, with the following "wild card" exceptions: a "#" denotes a digit from 0-9; a "&" denotes a letter from A-Z (or a-z); and a "!" denotes the ASCII character specified by the separator value. A "*" will denote any character.

Wild cards can be used to differentiate between different bar codes satisfying a particular standard. For example, with HIBC each instance of a product can have two separate bar codes, such as a primary bar code and a secondary bar code. Primary bar codes may provide unique product information and secondary bar codes may provide unique asset information. When scanning a product having multiple bar codes, each code is scanned separately. In turn, each scan provides different levels of information.

Referring to FIG. 14, a Medical HIBC Primary record 1411 has a prefix value of "+&" indicating that if a bar code starts with a "+" symbol followed by an alphabetic character and additional criteria are satisfied, the bar code is parsed according to the child records 1421-1425 of the Medical HIBC Primary record 1411.

Referring to FIG. 5, the segment component 550 (a child of the parent bar code component) includes various definition attributes including a name attribute 551, a sequence attribute 552, a code attribute 553, a min length attribute 554, a max length attribute 555, a description attribute 556, a data description attribute 557, a data format attribute 558, an action attribute 559, and a bar code ID attribute 560. These attributes represent information about specific segments of bar codes defined by a standard, such as the HIBC standard.

The name attribute 551 of the segment component 550 identifies a representative segment name. For example, in the HIBC Primary record example 1411 of FIG. 14, a location-type bar code, the first four alphabetic letters after the "+" symbol comprise a labeler identification code (LIC) 1422. The next segment, a reference segment that corresponds to a child record 1423, is variable in length and stores information to uniquely identify a product. The reference segment can be a minimum of one character long and a maximum of thirteen characters long. The next segment is a unit of measure segment (UOM) 1424, which is one character long. The last segment is a link character (LC) 1425, which is one character long.

The sequence attribute 552 of the segment component 550 identifies the order in which to parse a location-type bar code. It can also identify the order to parse a subsection of a code-type bar code. The code attribute 553, which applies only to code-based bar codes, identifies a code value at the beginning of the code section or segment. For location-type codes, this attribute is not used. The min length attribute 554 identifies the minimum length of a section of the bar code. Likewise, the max length attribute 555 identifies the maximum length of a segment of the bar code. Each segment having a min length that is not equal to the max length is identified as a variable length segment. The description attribute 556 identifies a description of a bar code segment. The data description attribute 557 identifies a name for the described bar code segment. This value is the name in the property set. The data format attribute 558 identifies the format of the associated data element and the action attribute 559 facilitates providing an application with instructions for using the segment of bar code data. The bar code ID attribute 560 identifies the identification of a parent record in the bar code table. In other words, this is the link to the bar code component.

FIG. 6 shows an example of a bar code enable repository object/component 600. The bar code enable component 600 facilitates scanning in and verifying of bar codes by defining an interface where the input method is applicable. The attributes of the enable component include a view attribute 601, an applet attribute 602, a field attribute 603, and a buscomp attribute 604. The view attribute 601 identifies a view to enable scanning in of a bar code. The applet attribute 602 identifies an applet to enable scanning of a bar code. The field attribute 603 identifies a buscomp field to enable scanning of a bar code. The buscomp attribute 604 identifies the business component on which the selected applet in attribute 602 is based.

IV. Representative Flows

FIGS. 7-11 are representative flow diagrams that depict processes used in some embodiments. These flow diagrams do not show all functions or exchanges of data; instead, they provide an understanding of commands and data exchanged under the system. Those skilled in the relevant art will recognize that some functions or exchange of commands and data may be repeated, varied, omitted, or supplemented, and other (less important) aspects not shown may be readily implemented.

The system provides support for notifying a bar code service of a bar code reader (e.g., bar code scanner) hardware event. In an object-oriented implementation, functionality for providing notification of bar code hardware events may be encapsulated in a set of bar code classes, with each class supporting specific bar code readers using proprietary schemes. Such classes may use an abstract interface that does not require other system applications to be aware of what kind of bar code reader is being used (e.g., dumb vs. smart). The specific bar code class to be used may be dynamically determined upon application startup or an initial scanning event.

Dumb bar code readers behave somewhat like keyboards. However, dumb readers distinguish themselves from keyboard actions by preceding their data with a character prefix, which is usually programmable. In contrast, smart readers typically lack hardware support for a programmable prefix. Where smart bar code readers are used, the developer communicates with them through a proprietary SDK (software development kit) provided by the manufacturer.

Figure 7:
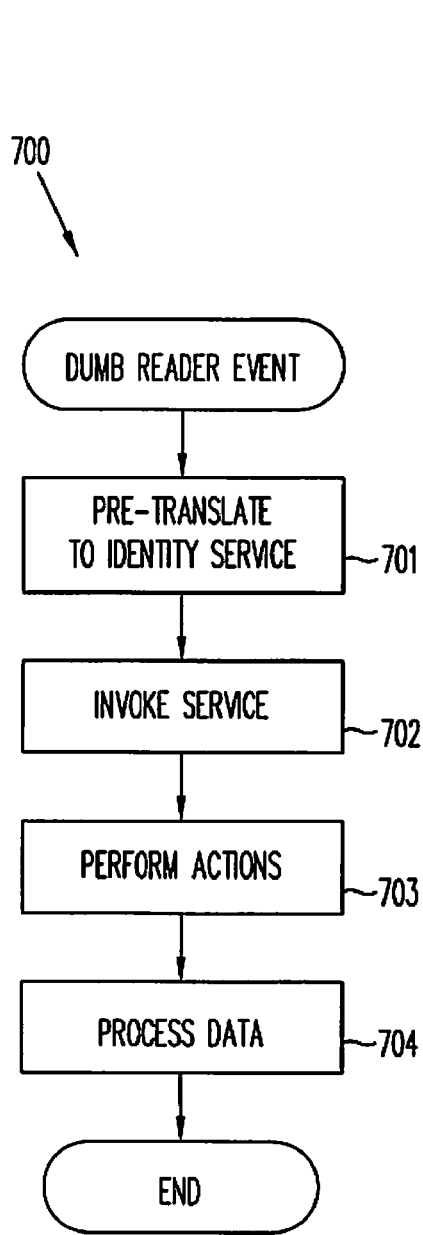
FIG. 7 is a flow diagram showing a sequence of operations triggered by a dumb bar code reader message.

Referring to FIG. 7, a flow diagram illustrates a sequence of operations 700 triggered by a dumb bar code reader event. At block 701 a command manager component invokes a pre-translate function to establish an appropriate service to handle the bar code event. In some embodiments, this may constitute determining that a message is a dumb bar code message by using an accelerator mechanism. The accelerator mechanism may be the bar code reader prefix. At block 702 the routine invokes the bar code service. In the case of a dumb reader, data may not be delivered directly to the service. Instead, only the notification that the bar code read was triggered is delivered. The data may then be delivered automatically to the destination field. At block 703, the bar code service performs various actions, which may include a build view action to navigate to the destination display/interface and various actions to activate cells and fields in a data record. In general, these actions allow bar code data to be positioned on an appropriate field in the data record. At block 704 a bar code service processes the data and the routine ends.

For smart bar code readers, the system parses bar code data according to tables in a web client administration screen that defines bar code standards. By default, this service sets fields to the appropriate parsed bar code data as defined in one or more administrative screens. However, application-specific logic can override this behavior and process the property set data differently. When a smart bar code reader is used, the system delivers data returned by the smart reader to a bar code service.

Figure 8:
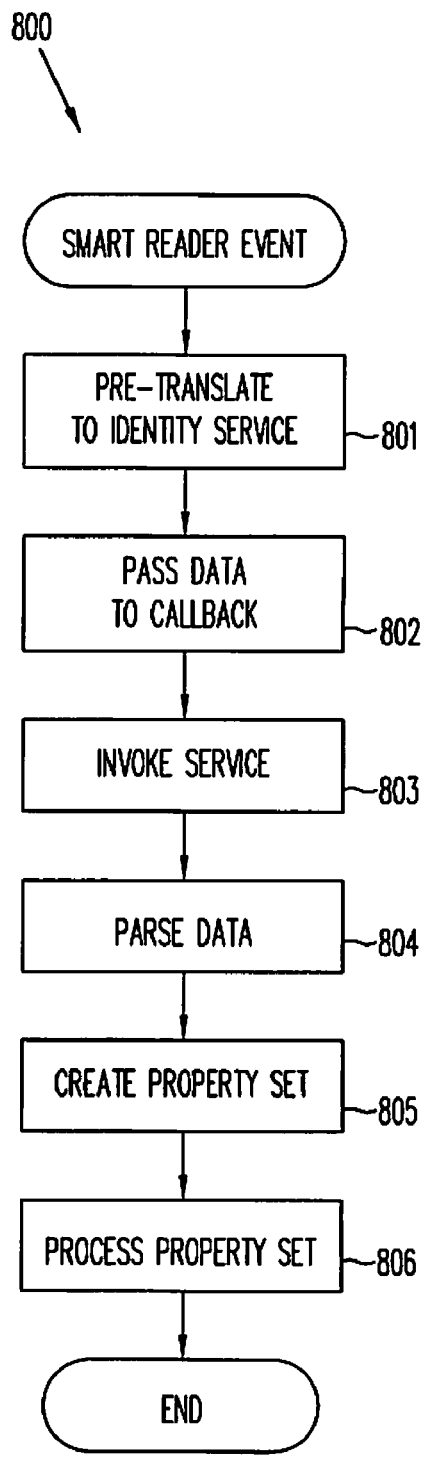
FIG. 8 is a flow diagram showing a sequence of operations triggered by a smart bar code reader message.

Referring to FIG. 8, a flow diagram is shown illustrating a sequence of operations or a routine 800 triggered by a smart bar code reader event. At block 801 a command manager component invokes a pre-translate function to establish an appropriate service to handle the bar code event. At block 802 an application component identified by the reader notifies a bar code service component and passes the data into a callback registered by the service. The data may be passed as a Unicode character string. At block 803 the routine invokes the bar code service or module. At block 804 when data is returned to the callback function, the bar code service or module parses the data according to how the appropriate bar code standard was defined. At block 805 the parsed data is put into a property set structure, from where it can then be passed to components or routines in other applications for more advanced processing. At block 806, the property set is processed by an appropriate application or application component. The routine ends after block 806.

With either smart or dumb device processing, the same services that parse the code may also be configured to pass results to another function or application for further processing. The results may be passed in two arguments. The first argument may be raw data from the scan. This first argument has a value when the scan is valid. The second argument is the property set of the parsed data (805 from FIG. 8). The property set contains name value pairs of a data description value and associated parsed data.

Figure 9A:
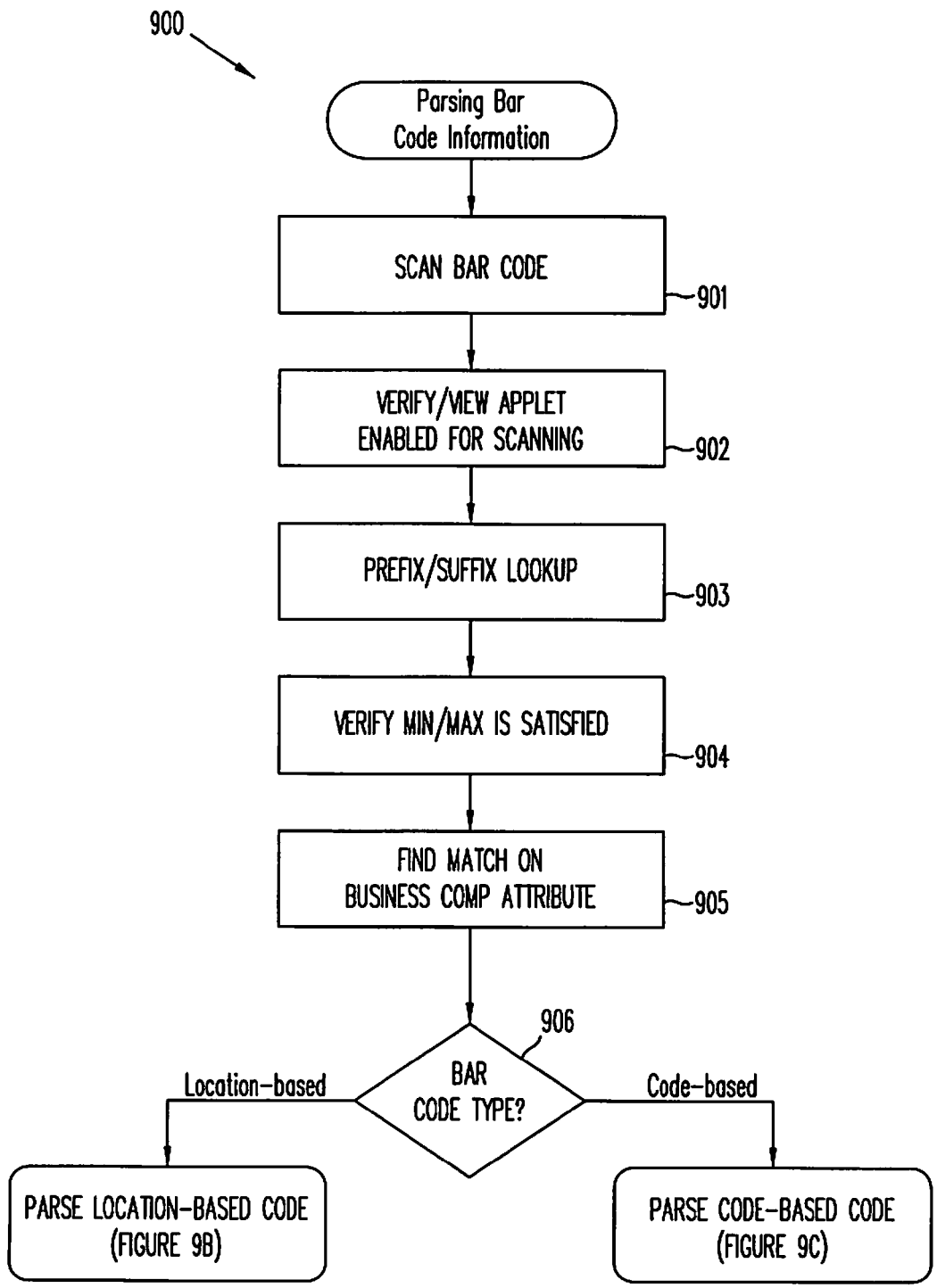
FIGS. 9A-9C are flow diagrams showing an example of a routine for parsing bar code information.
Figure 9B:
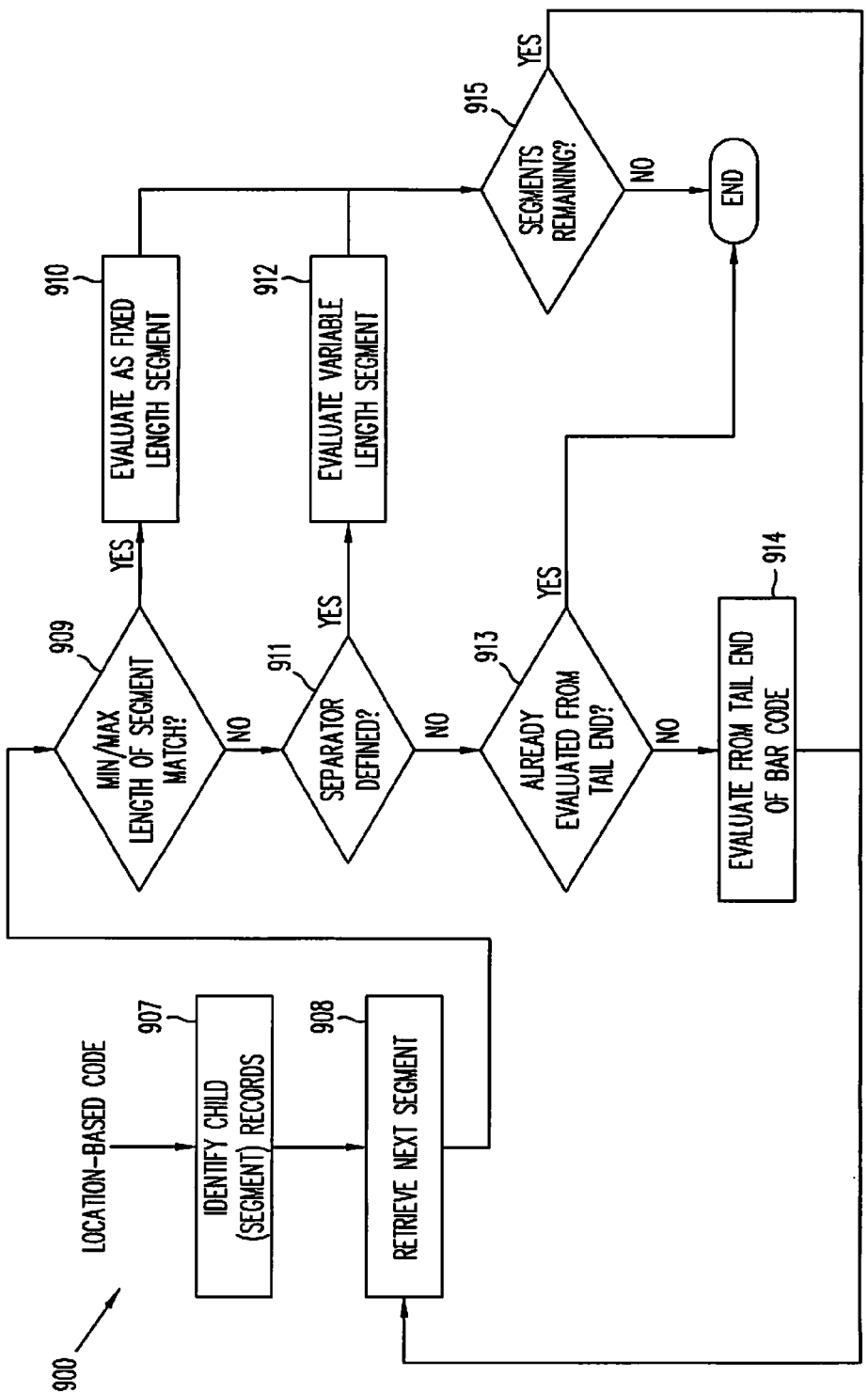
Figure 9C:
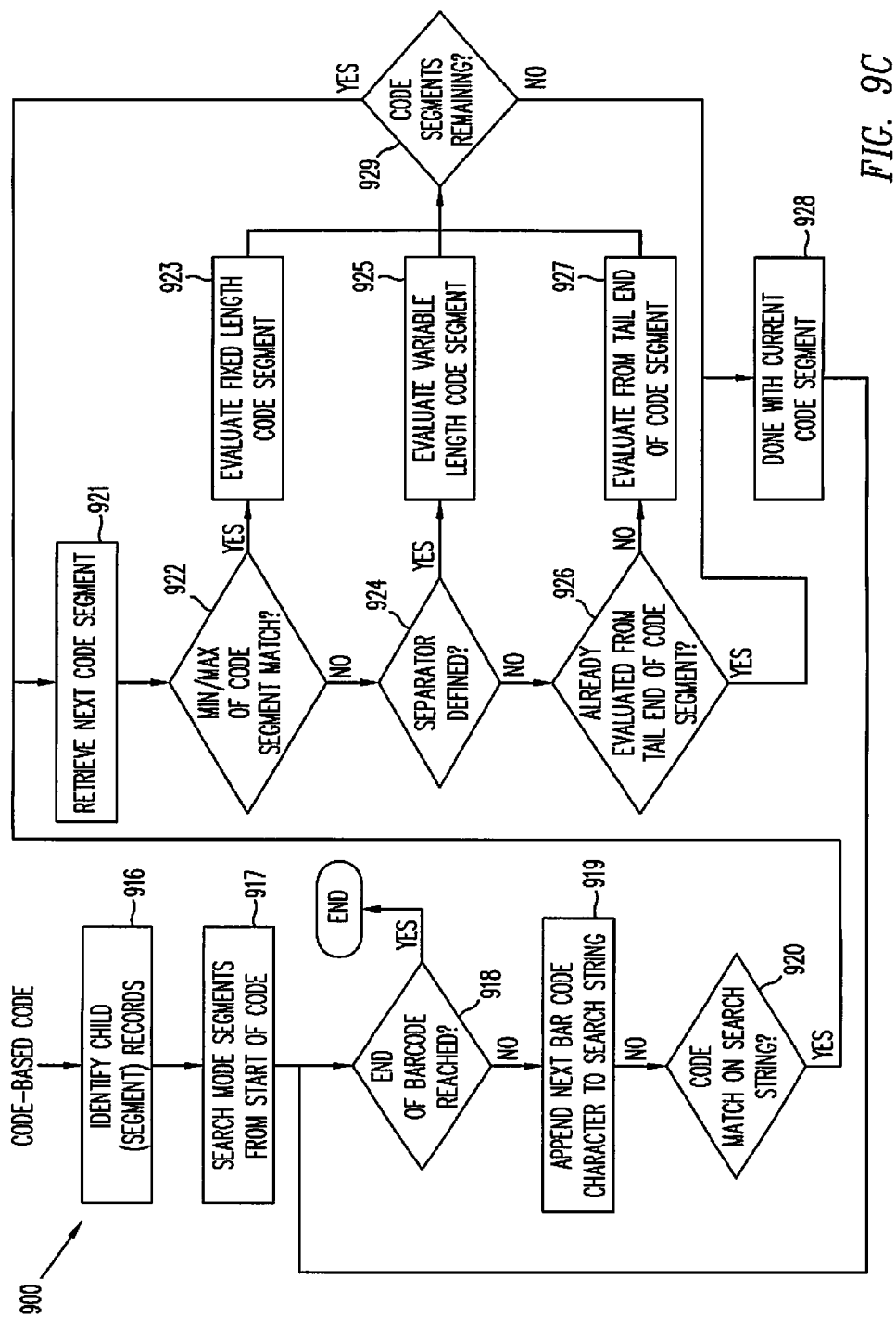

FIGS. 9A-9C show an example of a routine 900 for parsing bar code information (blocks 704 and 804 from FIGS. 7 and 8, respectively). Upon application startup, all previously entered bar code administration data may be cached for easy access. In this way, data can be read out directly from appropriate tables and stored in program memory. Each bar code scan results in accessing the administrative data from these variables. At block 901 a bar code is scanned. To facilitate efficient processing and storage of information, a first block of scanned-in data may be cached in a counting system until a subsequent scan and/or the system has enough information to process the current data. It is during this second scan that a data record is created for the first product. For example, during cycle counting, data obtained from one or two bar codes is displayed in the bar code view until a next item is scanned. When the next item is scanned, the previous information will be digested and one or more records created.

In some embodiments, where data from multiple bar codes is used to identify an appropriate product and asset, the data from the first scanned bar code may be cached until sufficient data is collected to create product and asset records. Caching may be done in a manner to provide for independence between the operation of the application and scanning sequences.

After scanning, the routine performs various actions to parse the inputted bar code, as shown in blocks 902-929. At block 902, the routine verifies that the active view and applet are enabled for scanning. At block 903, the routine does a prefix/suffix lookup. In the illustrated embodiment, the prefix/suffix values and code values are exact strings to compare, with the following "wild card" exceptions: a "#" denotes a digit from 0-9; a "&" denotes a letter from A-Z (or a-z); and a "!" denotes the ASCII character specified by a separator value or the end of a bar code in a particular code segment. For example, in a variable length bar code segment, positioned at the end of a bar code, there is no group separator. In such a case, the end of the bar code is implied to match the "!" symbol within a code value. Similarly, a "*" will denote any character. If the separator appears as the first character in the bar code, the routine will ignore it when parsing the bar code.

Once the correct bar code record is identified based on the prefix/suffix and length, at block 904, the routine verifies whether the scanned-in bar code satisfies the min/max requirements of the record. At block 905, the routine matches the business component. At decision block 906, the routine performs a type lookup. For example, the type can be a location-based bar code or a code-based bar code. If at decision block 906 the routine identifies the bar code as a location-based bar code, the routine continues at block 907 of FIG. 9B. If, however, at decision block 906 the routine identifies the bar code as a code-based bar code, the routine continues at block 916 of FIG. 9C.

Referring to FIG. 9B, when parsing a location-based bar code (explained in more detail with respect to FIG. 1400), the routine proceeds to block 907, where the routine performs a lookup for any child records associated with a bar code (1421-1425 of FIG. 14). Existing child records (e.g., the segment object/component 550 of FIG. 5) further define how a bar code will be parsed. In the case of a location-type bar code, each child record is evaluated in the order of a specified sequence to parse the bar code into segments according to min and max length.

At block 908, the routine retrieves a next segment of the location-based code. At decision block 909, starting from the beginning of the bar code data, the min length and max length fields for the next segment to be processed are examined to see how much data should be associated with a data description value. If at decision block 909 the min/max length fields match the min/max fields for the appropriate bar code definition, the routine proceeds to block 910, where the segment is evaluated as a fixed-length segment. If at decision block 909 the min/max fields do not match the bar code definition, the routine proceeds to decision block 911, where the routine checks for whether a separator has been included in the bar code definition. In some embodiments, the separator indicates where a bar code segment terminates.

If at decision block 911 a separator has not been defined, the routine proceeds at block 912, where the segment is evaluated as a variable length segment. The variable segment can be anywhere in the bar code. The variable-length segment is isolated by reading up to the group separator, the maximum length of the section, or the end of the bar code, whichever is encountered first. In this way, the group separator enables the parsing of bar codes with multiple variable length segments. If, at decision block 911, a separator has not been defined, the routine continues at decision block 913, where the routine checks to see if the bar code has already been evaluated from its tail end. If at decision block 913 the bar code has already been evaluated from its tail end, the parsing is complete and the routine ends. Otherwise, if at decision block 913 the bar code has not already been evaluated from its tail end, the routine continues at block 914, where the routine evaluates the bar code from its tail end to identify the variable length string based on the known fixed length strings in the bar code. Following block 914, the routine returns to block 908 to retrieve a next segment of the location-based code.

Alternatively, following blocks 910 and 912, the routine proceeds to decision block 915, where it checks to see if the bar code has remaining segments to process. If, at decision block 915, there are no remaining segments to process, the routine ends. Otherwise, the routine loops back to block 908, where the next segment is evaluated.

From decision block 905 of FIG. 9A, if the code is identified as a code-based bar code (e.g., 1508 of FIG. 15), the routine proceeds to block 916 of FIG. 9C. At block 916 the routine identifies one or more child (segment) records for the bar code type (see, e.g., records 1511-1519 of FIG. 15). At block 917, the routine searches the segments of the bar code beginning at the start of the code. At decision block 918, if the end of the bar code is reached, the routine ends. Otherwise, if at decision block 918 the end of the bar code has not been reached, the routine continues at block 919, where the routine appends the next bar code charter to a search string.

At decision block 920, if a search using the search string turns up a matching record for the bar code, the routine proceeds to block 921. Otherwise, if there is no match at decision block 920, the routine loops back to decision block 918.

At block 921 the routine retrieves the next code segment from the bar code. At decision block 922, if the code segment does not match the min/max requirements of the definition, the routine continues at decision block 924. If, however, at decision block 922 the code segment does match the min/max requirements, the routine continues at block 923, where the routine evaluates the fixed length code segment.

At decision block 924 the routine is dealing with a variable length code segment. Accordingly, if at decision block 924 a separator is not defined for the code segment, the routine continues at decision block 926. If, however, at decision block 924 a separator is defined, the routine continues at block 925 where the routine evaluates the variable length segment knowing the variable length string ends at the separator.

At decision block 926, the routine checks to see if the code segment has already been evaluated from its tail end. If at decision block 926 the code segment has been evaluated from its tail end, the routine proceeds to block 928 where the routine is finished parsing the current code segment. If, however, at decision block 926 the routine has not been evaluated the code segment from its tail end, the routine continues at block 927 where the routine evaluates the code segment from its tail end working backwards to identify the variable length string based on the known fixed length string.

Following blocks 923, 925, and 927 the routine proceeds to decision block 929, where the routine checks to see if there are code segments remaining in the bar code. If at decision block 929 there are remaining code segments, the routine loops back to block 921 to retrieve the next code segment. If, however, at decision block 929, there are no code segments remaining, the routine proceeds to block 928, where the routine is finished parsing the current code segment. Following block 928, the routine loops back to decision block 918 where the routine checks to see if the end of the bar code has been reached.

Figure 10:
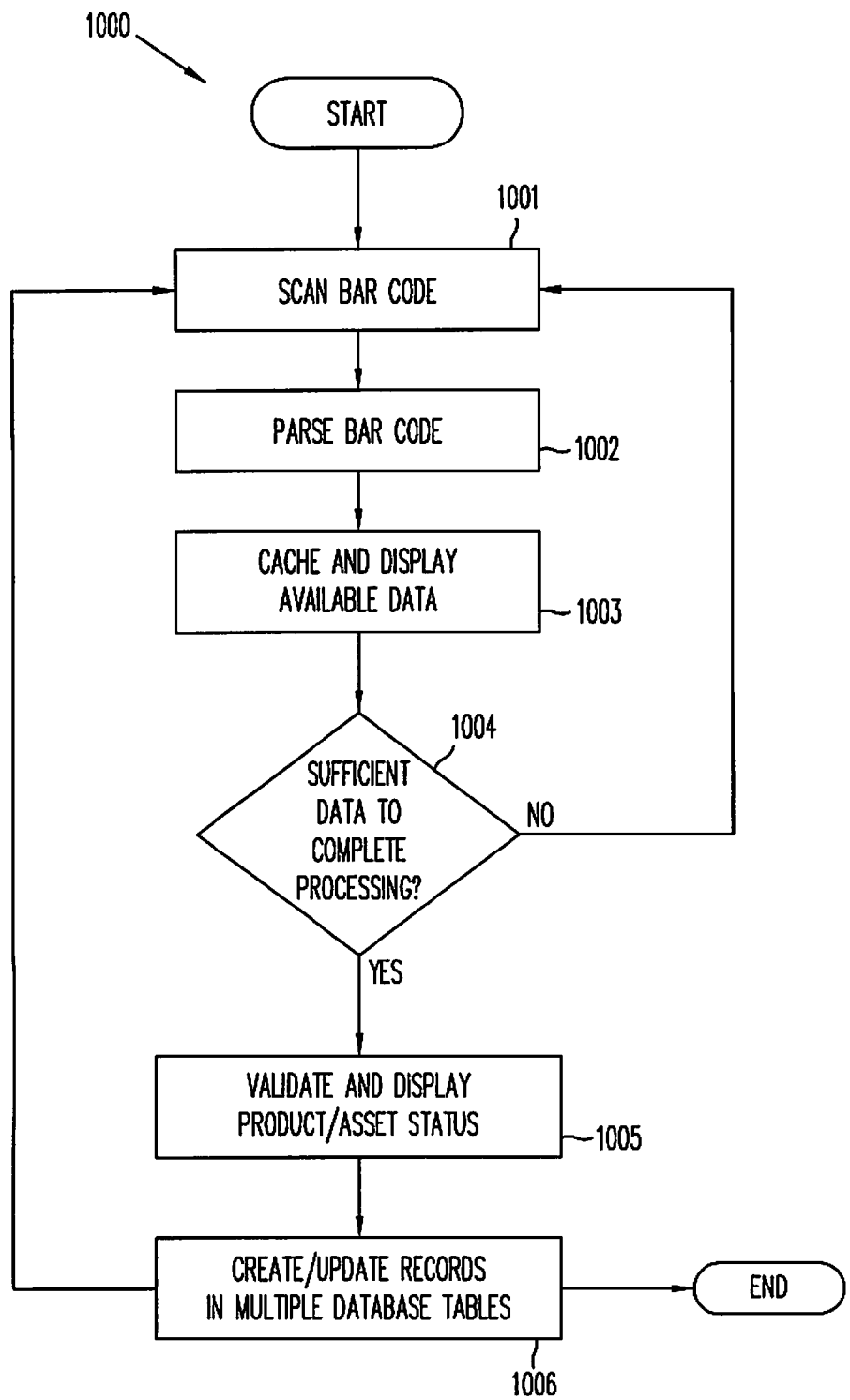
FIG. 10 is a flow diagram showing an example of processing of bar code data and preparing it for use in one or more applications.

FIG. 10 shows a routine 1000 for processing bar code data and preparing it for use in one or more applications. At block 1001 the bar code data is received, such as through a scanning event. At block 1002 the routine parses the received bar code data, as shown for example in FIGS. 9B and 9C. At block 1003, the routine caches data resulting from the parsing and displays associated data that is available in the system. At decision block 1004, if sufficient data is available to complete the processing of the bar code data, the routine continues at block 1005. Otherwise, the routine loops back to block 1001, where the next bar code data is received. At block 1005, because the available data is sufficient to complete the processing of the bar code data, the routine validates the bar code data and displays product and asset information related to the bar code. At block 1006, the routine creates or updates one or more records in one or more database tables associated with the received bar code data. The routine ends after block 1006.

V. User Interface

FIGS. 11-14 provide examples of screens and processes used in inventory management processes. For example, the system can schedule cycle counts, start cycle counts, scan bar codes for cycle counts, and complete cycle counts.

Figure 11:
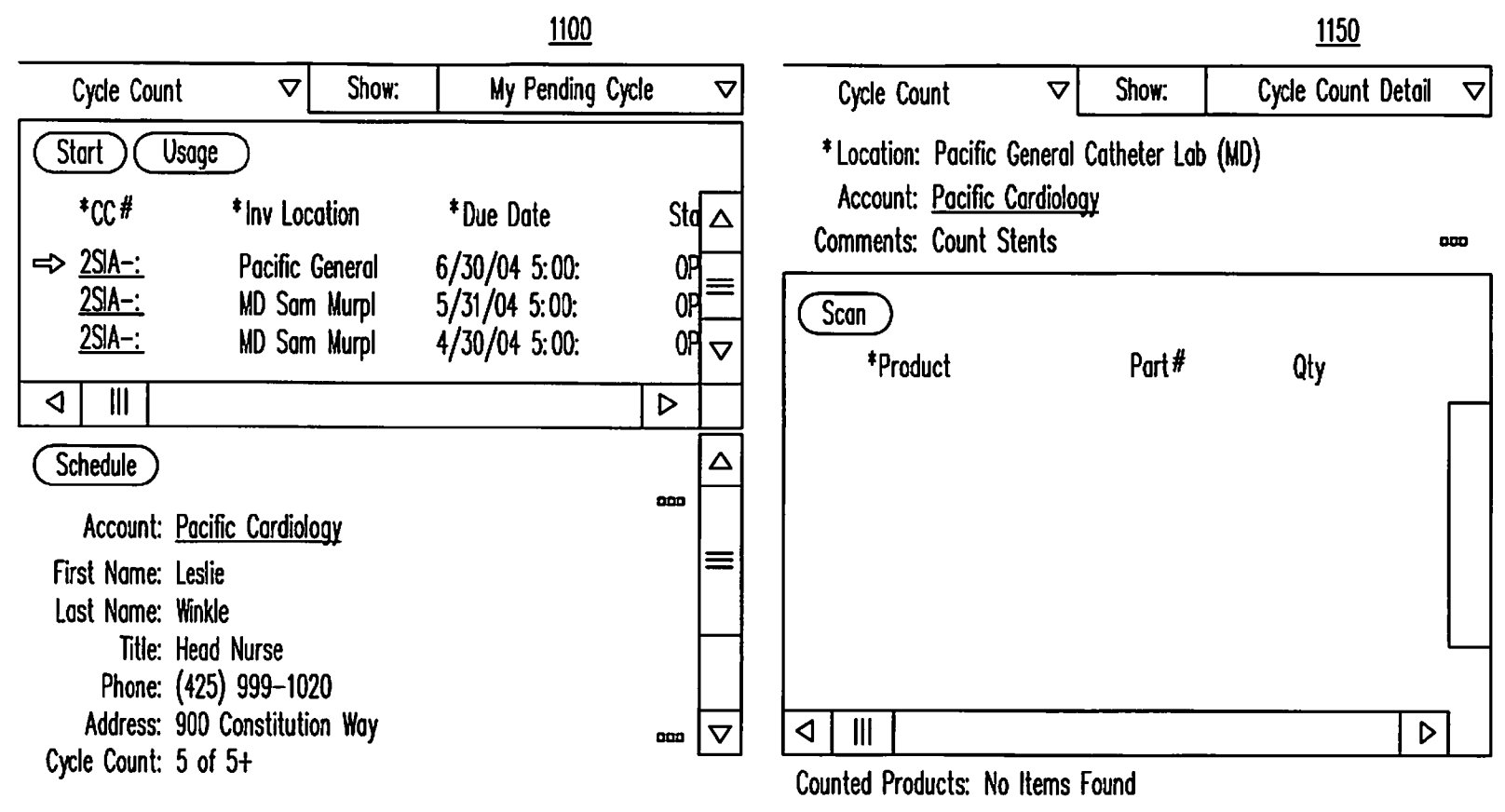

FIG. 11 shows a scheduling screen 1100 for scheduling a cycle count and a start screen 1150, which is displayed to an end user at the start of a cycle count. A bar code view (shown in the start screen 1150) may serve as a view for displaying real-time scanned bar code information. Information displayed in the bar code view may not be stored in the database immediately, but instead may be cached in memory. After the requisite bar code data is present in memory and all error conditions and uniqueness validations are satisfied, the appropriate records may then be created and stored in a database. The fields present in the bar code view may include a bar code product name, a bar code part number, a bar code lot number, a bar code expiry date, a bar code serial number, a bar code asset number, a bar code days left, a bar code state, and a bar code quantity.

In some embodiments, the user can navigate to the scan bar code view by using a scan button on a cycle count detail view. The scan bar code view enables a user to view product and asset information obtained from the product. The user can keep pressing a button on the side of the device for repeated scans. The user can clear a bar code input using a clear button. The user can create a transaction to move a product out of an inventory using a move button. The user can adjust a current bar code and return to a cycle count detailed view using a stop button.

Figure 12:
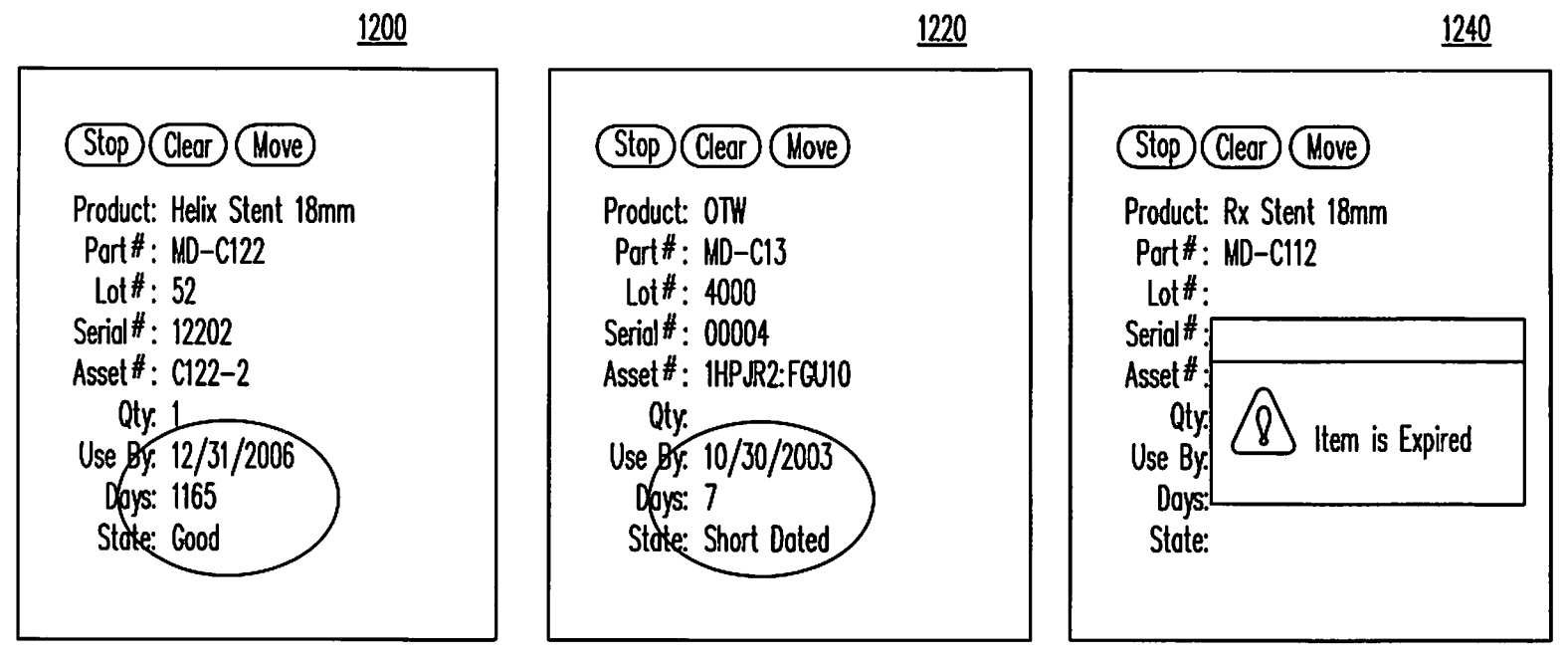

FIG. 12 shows a cycle count being performed and more specifically the automatic validation of data in a cycle count. A first screen 1200 shows an example of a scanned item with a "good" state. A second screen 1220 shows an example of an item with a "short dated" state. A third screen 1240 shows a display of a scanned item with an "expired" state. As shown in screen 1240, a set of error messages may be created to indicate items that are expired, an error in reading or processing a bar code, a bar code being scanned prior to a sequence being complete, or a duplicate record (e.g., item already scanned). For each error type, a different .wav file or other audio file may be accessed.

FIG. 13 shows a screen 1300 that indicates a cycle count has been completed. Each product scan in the cycle count is displayed on the screen. This includes information about the product name, product part number, product quantity, and product description. In addition, an account location, an account name, and account comments may also be displayed.

FIGS. 14-16 provide examples of screens and processes for inputting administrative bar code information, such as information about bar code standards and product information. In particular, FIG. 14 shows an example of a bar code definition administration screen 1400 used in defining bar codes and code standards. The screen includes a top portion 1410 showing parent records and a bottom portion 1420 showing child records The bar code definition screen 1400 allows the administrative user to input new information for bar code standards (e.g., via a "new" button) and to view existing information. As described with respect to FIG. 5, this information can be stored in the form of bar code and segment repository objects. Once stored, this information can be used to parse bar codes. The following description illustrates parsing a location-based bar code represented by the characters "+S001H18C1220L" using the definitions illustrated in the bar code definition administration screen 1400:

1. The bar code definition screen 1400 includes multiple parent records (1411-1417). The first record 1411 has a sequence=1. Accordingly, the parsing algorithm begins with this record:

a. Does the bar code data "+S001H18C1220L" start with "+&" (where &=alphabetic character A-Z or a-z)? Yes, it starts with "+S."
b. Is the length of the bar code between eight and twenty characters? Yes, it is fourteen characters long. Accordingly, the algorithm knows to use one or more child records (1421-1425) of the first record 1411 to parse the data.
2. The parsing algorithm continues by determining a type for the first record 1411. For the first record 1411, type=location, meaning it is a location-based bar code. The type determines how the algorithm will use the child records (1421-1425) to parse the data. For location-based bar codes, all data elements are present in the specified sequence.
3. The algorithm next evaluates the child records (1421-1425) in order of their sequence.
4. The first child record 1421 instructs the algorithm to take the first digit of bar code data (min=1, max=1) and map it to a data element referred to as "Plus." The algorithm opens a property set and stores the following: "+, Plus."
5. After the first character of the bar code is evaluated, the characters "S001H18C1220L" remain. The second child record 1422 (sequence=2) instructs the algorithm to take the next four digits (min=4, max=4) and associate them with an LIC data element. The device adds the following to the property set: "S001, LIC."
6. After step 5, the characters "H18C1220L" remain. The third record 1423 (sequence=3) is variable in length. The algorithm knows this because min is not equal to max (min=1, max=13).
7. Referring back to the first record 1411, its separator field is blank. Because this field is blank, the algorithm knows that there is only one variable length field in the bar code. Given that, the algorithm determines the actual length of the variable length field by working backwards from the end of the bar code.
8. After step 7, the characters "H18C1220L" remain. Looking at the last child record 1425 (sequence=5), the algorithm determines that the last digit (min=1, max=1), L is the LC. The device adds to the property set: "L, LC."
9. After step 7, the characters "H18C1220" remain. Child record 1424 (sequence=4) reveals that the next to last digit, "0" is the UOM or: "0, UOM."
10. After step 7, the characters "H18C122" remain. These remaining characters "H18C122" are associated with the third record 1423, and constitute the product reference ID. The algorithm adds "H18C122, Product Reference ID" to close the property set. Thus, the property set contains:
a. +, Plus
b. S001, LIC
c. L, LC
d. 0, UOM
e. H18C122, Product Reference ID FIG. 15 shows a second example of a bar code definition administration screen 1500 used in defining bar codes and code standards. Like screen 1400 of FIG. 14, the screen 1500 includes a top portion 1510 showing parent records and a bottom portion 1520 showing child records. The following description illustrates parsing a code-based bar code represented by the characters "^010299496500013L."
1. The "^" in this bar code is a special character used to represent a group separator. In the illustrated embodiment, the algorithm ignores the group separator.
2. As described above with respect to FIG. 14, the algorithm attempts to match the bar code data using bar code definition records starting with the record with sequence=1 (e.g., 1411 of FIG. 14): Does the bar code start with "+&" (&=alphabetic character) (e.g., 1411 of FIG. 14)? No.
3. Does it start with "+#" (e.g., 1412 of FIG. 14)? No.
4. Does it start with "+$#" (e.g., 1413 of FIG. 14)? No.
5. Does it start with "+$&" (e.g., 1414 of FIG. 14)? No.
6. Does it start with "+$$0" (e.g., 1415 of FIG. 14)? No.
7. Does it start with "+$$1" (e.g., 1416 of FIG. 14)? No.
8. Does it start with "+$$2" (e.g., 1417 of FIG. 14)? No. etc.
9. Eventually, it arrives at a parent record 1511: Does it start with "#" (i.e., a number)? Yes.
10. The type for the parent record 1511 is code-based. That means that any, none, or all of the data elements described in the child records associated with the parent record 1511 may be present in any sequence.
11. Accordingly, the algorithm uses the child records 1521-1529 of the parent record 1511 (named "Medical UCC/EAN Concatenated or Secondary") to parse the bar code.
12. Starting from the left of the bar code, the algorithm attempts to match the bar code data with the code value (i.e., reading from left to right, adding digits until a code match is found).
13. Is there a record with code=0 in the child records (1521-1529)? No.
14. Is there a record with code=01 in the child records (1521-15129)? Yes.
15. Is a separator defined in the Medical UCC/EAN Concatenated or Secondary parent record 1511? Yes. The value in the separator field for parent record 1511 indicates that the ASCII 29 character represents the group separator and is used at the beginning of the bar code and to signal the end of a variable length string within a bar code (i.e., not at the end of the bar code).
16. The algorithm determines if there are there any code=01 child records that are variable in length (i.e., min does not equal max). If so, it will read up until the group separator or the end of bar code to identify the segment end and use that section for parsing.
17. The algorithm finds all the records with the matching code 01 (1521-1524).
18. The algorithm navigates the child records with code=01 in order of their sequence to parse the code.
19. The first child record 1521, has a code value code=01 and a sequence value sequence=1. This indicates that the first two digits 01, map to code 01
20. The next child record 1522, has a code value code=01 and sequence value sequence=2. This indicates that the next character, "0," is the UOM.
21. The next 12 characters, "299496500013," constitute the Product reference ID.
22. "L," is the LC.
23. The property set is:
a. 01, Code 01
b. 0, UOM
c. 299496500013, Product Reference Id
d. L, LC To further illustrated the parsing of defined code-based bar codes, the following steps describe parsing the code "^11704060106654355^2111202^3050." For this bar code, the parent definition record is located in a process similar to the previous example described above (i.e., the algorithm drops the first separator and looks for a match in prefix/ suffix/length according to record sequence). For this particular bar code, the first match of prefix/suffix and min/max length is also parent record 1511.

1. Referring to record 1511, the type for the bar code is code-based. This information instructs the algorithm how to use the child records to parse the data (i.e., any, none, or all of the data elements may be present in the in any sequence for code-based bar codes).
2. The child records 1521-1529 are used to parse the data.
3. The algorithm looks for records with code=1 and does not find a match.
4. The algorithm searches for child records with code=17 and finds records 1527 and 1528.
5. Is there a variable length segment in code 17? No.
6. The algorithm reads the total length of the code segment based on min/max.
7. The first two characters "17" correspond to the code 17 child record 1527.
8. The next 6 characters 1518, "040606," correspond to expiry date in format YYMMDD, or 04/06/06.
9. After step 8, the characters "10654355^2111202^3050" remain. The algorithm next looks for code=1 ? No match.
10. The algorithm then looks for code=10? Yes, match.
11. The algorithm identifies records corresponding to code 10 (i.e., 1525-1526).
12. Is there a variable length segment with code 10? Yes.
13. Accordingly, the algorithm parses the remaining code until it finds the separator indicated by the ASCII field in the bar code component record (in this case ASCII 29 represented by a "^" in the previous example based on record 1511) or the end of the bar code string. In this case, there is a "^" (ASCII 29) terminating the segment. So, the algorithm parses the string "10654355" using the code 10 records.
14. The first two characters "10," correspond to code 10 (record 1525).
15. The next 1-20 digits correspond to the lot number (record 1526), so the algorithm reads up to the separator to find the end of the string. Accordingly, "654355" corresponds to the lot number.
16. After step 15, the characters "2111202^3050" remain. Are there records with code=2? No.
17. Are there records with code=21 ? Yes.
18. The first two characters "21" correspond to code 21.
19. Is there a variable length string within the code 21 records? Yes.
20. The next 1-20 digits correspond to the serial number. Accordingly, the algorithm reads up to the separator to find the end of the string and determines that "11202" corresponds to the serial number.
21. After step 15, the characters "3050" remain. Now the algorithm locates records with code=30.
22. The first two characters "30" correspond to code 30 (not shown).
23. The next 1-8 digits correspond to quantity (not shown), so the algorithm reads up to the (gs) or the end of the bar code string to find the end of the string. In this case, this code is at the end of the bar code string (so no separator is needed), so "52" corresponds to the quantity.

FIG. 16 is a third example of an administration screen 1600 from which specific product information may be entered and eventually associated with a scanned-in bar code (via, for example, a product number or unique identifier provided in a bar code). This information may include information relevant to specific products or even specific items. While some of the information may be manually inputted, other aspects of the information may result from receiving scanned information for a particular product. The fields displayed in this screen 1600 include a bar code standard field 1601 which links the product to a particular bar code standard. A unique ID field 1602 and an expression field 1603 provide more specific information about the product. A "<1 bar code" check box 1604 may also be provided to identify whether more than one bar code is used to tag the product.

Information in FIG. 16 may be combined with the data parsed from the bar code. A record in the product admin screen (FIGS. 14 and 15) with Unique Id=Product Reference ID identifies the product represented by the bar code. The record indicates if more than one bar code is required to uniquely identify an product/asset pair.

The record also indicates the combination and sequence of data elements required to uniquely identify an asset for the product (e.g., using an expression field). Based on the expression field, data elements are concatenated and used to find the associated asset record where the asset's unique ID is equal to the value formed based on the expression.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for managing automatic identification of items using an executable computer-implemented framework for defining and administering standardized item identifiers, the method comprising:

providing a flexible data model for storing information defining one or more standardized identification schemes, wherein configured to define the one or more standardized identification schemes during execution of the computer-implemented framework by virtue of being configured to define a first data structure component, the first data structure component is configured to define multiple automatic identification code standards, and each instance of the first data structure component defines a distinct automatic identification code standard or a subset of a distinct automatic identification code standard; and providing a second data model for storing information associated with items that are identifiable using the executable computer-implemented framework, wherein the second data model is configured to facilitate defining the one or more standardized identification schemes during execution of the computer-implemented framework by virtue of being configured to define a second data structure component, the second data structure component is configured to define multiple automatic identification code segments, each instance of the second data structure component is linked to an instance of the first component, and each instance of the second data structure component defines at least one identifiable segment of an automatic identification code.

2. In a computer system, a method for collecting, storing, and processing automatic identification code information, the method comprising:

providing a first data structure component configured to define multiple automatic identification code standards, wherein each instance of the first data structure component defines a distinct automatic identification code standard or a subset of a distinct automatic identification code standard; and providing a second data structure component configured to define multiple automatic identification code segments, wherein each instance of the second data structure component is linked, at least virtually, to an instance of the first component, and wherein each instance of the second data structure component defines at least one identifiable segment of an automatic identification code.

3. The method of claim 2, further comprising a third component for defining one or more user interfaces, wherein each instance of the third component defines a user interface for inputting automatic identification code information for an automatic identification code having a type defined by an instance of the first data structure component.

4. The method of claim 2 wherein each instance of the first data structure component stores information relating to whether the distinct automatic identification code standard or subset of the distinct automatic identification code standard uses location-based or code-based automatic identification codes.

5. The method of claim 2 wherein each instance of the second data structure component stores information relating to a sequence in which to parse a bar code segment or a sequence in which to parse a subsection of a bar code segment.

6. The method of claim 2 wherein the first data structure component facilitates defining separator characters, and wherein each defined separator character facilitates matching distinct instances of the first or second data structure component to automatic identification code input.

7. The method of claim 2 wherein the second data structure component facilitates defining a data format for instances of the second component.

8. A method of processing automatic identification codes, the method comprising:
receiving automatic identification code information via a device for inputting automatic identification codes, wherein the received automatic identification code information has a structure; and
parsing the received automatic identification code information, wherein the parsing is based on at least one stored automatic information code definition, and wherein the parsing comprises:
determining, based on the structure of the received identification code information, an automatic identification code definition associated with the automatic identification code;
isolating segments in the received automatic identification code; and
evaluating each of the isolated segments, comprising matching information associated with each of the isolated segments with attributes of the at least one stored automatic information code definition.

9. The method of claim 8, further comprising identifying a corresponding module for parsing the received automatic identification code information.

10. The method of claim 8, further comprising processing the parsed automatic identification code information, wherein the processing comprises integrating the automatic identification code information into one or more distinct applications or systems for managing product information.

11. The method of claim 8 wherein the automatic identification code corresponds to a product.

12. The method of claim 8 wherein the automatic identification code corresponds to a unique instance of a product.

13. The method of claim 8 wherein the automatic identification code corresponds to an item that is not a product.

14. The method of claim 8, further comprising creating a record associated with the received automatic identification code information, wherein the creating of the record comprises collecting information over one or more input events to uniquely identify an item.

15. An automatic information code management system comprising:
an automatic information code input device for inputting raw data associated with automatic information codes; and
a service for processing the raw data, wherein
the service performs actions comprising:
preparing the raw data for parsing;
parsing the raw data into identifiable segments, wherein
the parsing of the raw data into identifiable segments comprises evaluating whether one or more characters in the raw data corresponds to at least one character identified in an automatic information code management definition; and
creating an output set for the parsed data, wherein the output set is configurable for providing information related to the raw data to one or more applications for further processing.

16. The system of claim 15 wherein the information code management definition is stored in the system.

17. The system of claim 15 wherein the one or more applications comprises an application configured to perform an inventory management process.

18. The system of claim 15 wherein the input device is a smart reader.

19. The system of claim 15 wherein the input device is a dumb reader.

20. The system of claim 15 wherein the parsing of the raw data into identifiable segments further comprises evaluating whether one or more characters in the raw data corresponds to at least one separator character identified in the automatic information code management definition.

21. The system of claim 15 wherein the parsing of the raw data into identifiable segments comprises evaluating whether one or more characters in the raw data corresponds to at least one character identified in the automatic information code management definition, and where the at least one character may be identified using a wild card character definition.

22. A computer-readable medium comprising a data structure for use in a method for integrating automatic information into a data processing system, the method comprising:
receiving automatic identification code information via a device for inputting automatic identification codes; and
parsing the received automatic identification code information, wherein the parsing comprises:
determining, based on prefix data in the received identification code information, an automatic identification code definition associated with the automatic identification code; and
evaluating one or more segments of the received identification code based, at least in part, on the automatic identification code definition, wherein the evaluating comprises matching information associated with each of the segments of the received identification code with stored data for defining the automatic identification code.

23. The computer-readable medium of claim 22 wherein the computer-readable medium is a computer-readable disk.

24. The computer-readable medium of claim 22 wherein the computer-readable medium is a data transmission medium transmitting a generated data signal containing the contents of the generated data signal.

25. The computer-readable medium of claim 22 wherein the computer-readable medium is a memory of a computer system.

26. A system for processing automatic identification codes, the system comprising:
means for receiving automatic identification code information;
means for parsing the received automatic identification code information, wherein the parsing comprises:
determining, based on the structure of the received automatic identification code information, an automatic identification code standard associated with the automatic identification code;
isolating segments in the received automatic identification code; and
evaluating each of the isolated segments, comprising matching information associated with each of the segments of the received automatic identification code with stored data for defining the automatic identification code; and
means for processing the parsed automatic identification code information, wherein the processing comprises integrating the automatic identification code information into a system for managing information.

27. The system of claim 26 wherein the processing of the parsed automatic identification code information comprises validating a date associated with an item associated with the automatic identification code.

28. The system of claim 26 wherein the processing of the parsed automatic identification code information comprises validating information associated with the automatic identification code, and wherein the validating comprises generating an output event associated with the success of the validation.

29. A method in a computer for processing automatic identification code data information, the method comprising:
receiving information associated with a first identification code, wherein the first identification code information is associated with an item unit, wherein processing of the first identification code information is dependent on receiving information associated with one or more additional identification codes, and wherein the one or more additional identification codes are also associated with the item unit;
storing the received information;
receiving information associated with the one or more additional identification codes; and
processing the first identification code based, in part, on the information associated with the one or more additional identification codes.

30. The method of claim 29 wherein the first identification code is a secondary bar code, and wherein the at least one of the one or more additional identification codes is a primary bar code.

* * * * *